(12) United States Patent
Lu

(10) Patent No.: US 7,302,138 B2
(45) Date of Patent: Nov. 27, 2007

(54) ARRAYED WAVEGUIDE GRATING DEVICE

(75) Inventor: Hung-Chih Lu, Guanyin Township, Taoyuan County (TW)

(73) Assignee: Way-Seen Wang, Taipei (TW)

( * ) Notice: Subject to any disclaimer, the term of this patent is extended or adjusted under 35 U.S.C. 154(b) by 0 days.

(21) Appl. No.: 11/233,047

(22) Filed: Sep. 23, 2005

(65) Prior Publication Data

US 2007/0071388 A1   Mar. 29, 2007

(30) Foreign Application Priority Data

Oct. 1, 2004   (TW) .............................. 093215564

(51) Int. Cl.
*G02B 6/34* (2006.01)
*H04J 14/02* (2006.01)

(52) U.S. Cl. .......................... 385/37; 385/43; 385/129; 385/132; 385/140; 398/83; 398/87

(58) Field of Classification Search ................... 385/12, 385/43, 37, 129, 130, 131, 132, 140; 398/83, 398/87

See application file for complete search history.

(56) References Cited

U.S. PATENT DOCUMENTS

| 6,266,464 B1* | 7/2001 | Day et al. ...................... 385/37 |
| 6,374,013 B1* | 4/2002 | Whiteaway et al. ........... 385/37 |
| 6,888,985 B2* | 5/2005 | Hosoi ............................ 385/37 |
| 7,043,120 B2* | 5/2006 | Wada et al. .................... 385/37 |
| 2002/0001433 A1* | 1/2002 | Hosoi ............................ 385/37 |

* cited by examiner

*Primary Examiner*—Brian M. Healy
(74) *Attorney, Agent, or Firm*—Troxell Law Office, PLLC

(57) ABSTRACT

The present invention comprises an arrayed waveguide grating member, a taper multimode interference coupler and a taper optical attenuator to uniform and flatten a passband in an optical device.

17 Claims, 26 Drawing Sheets

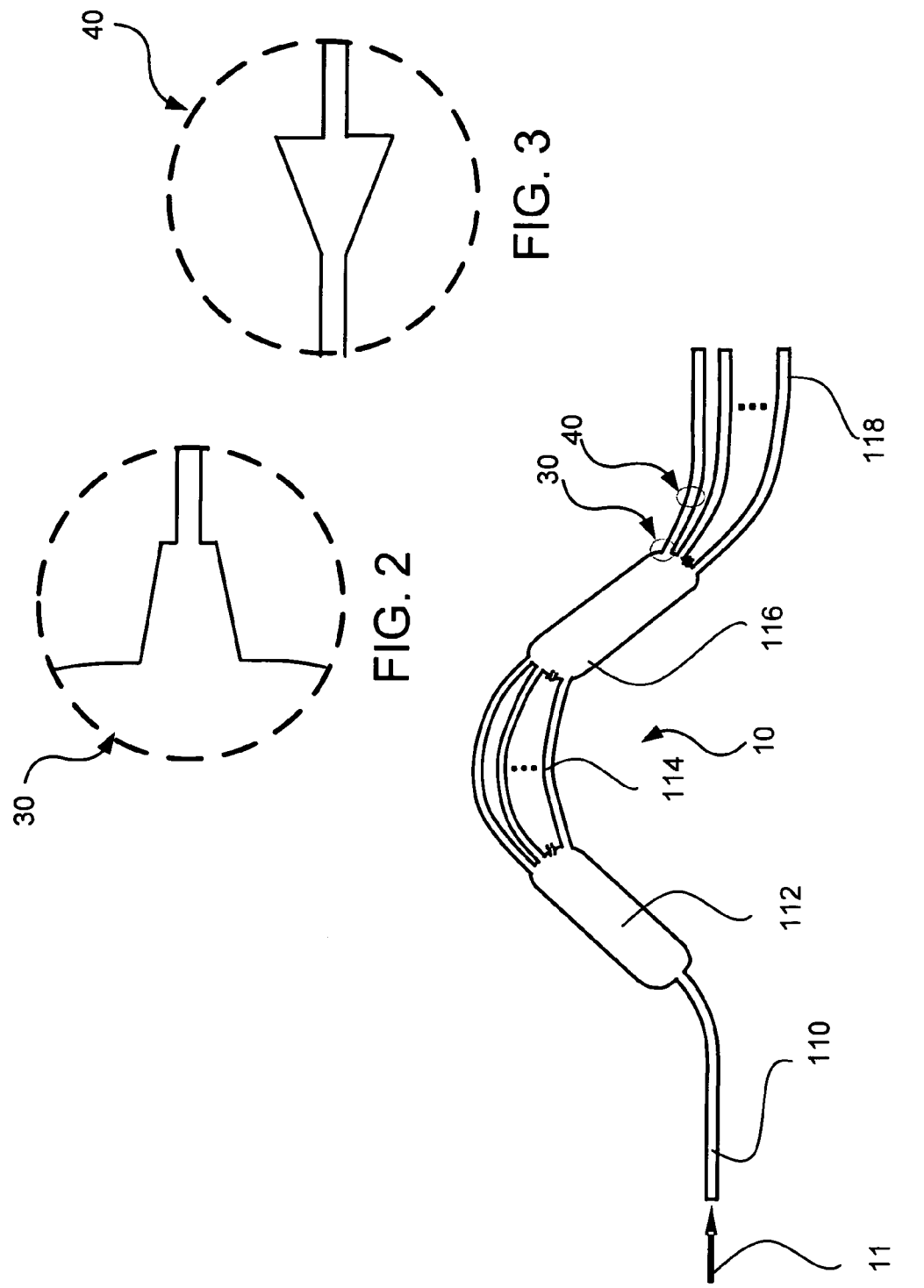

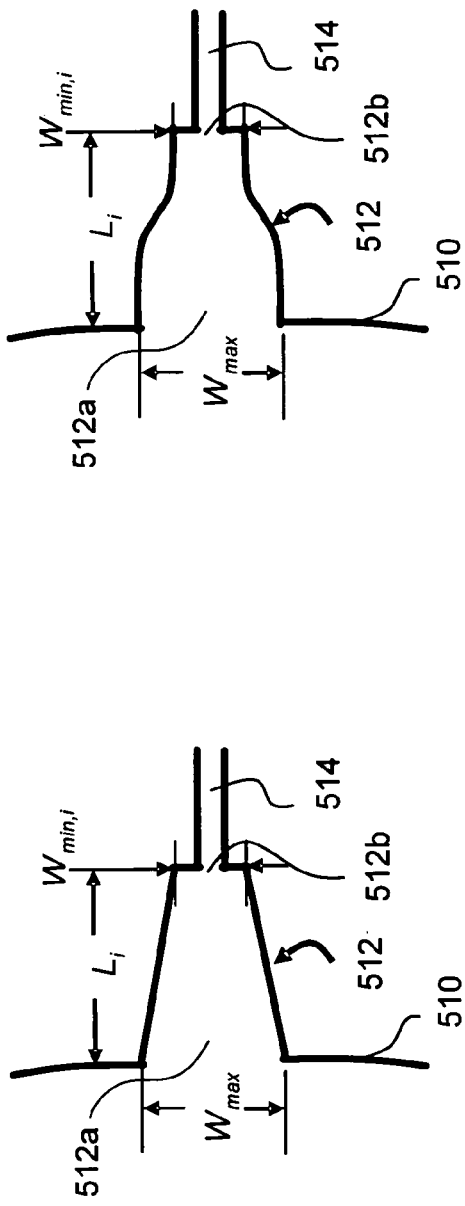
FIG. 7B
FIG. 7A
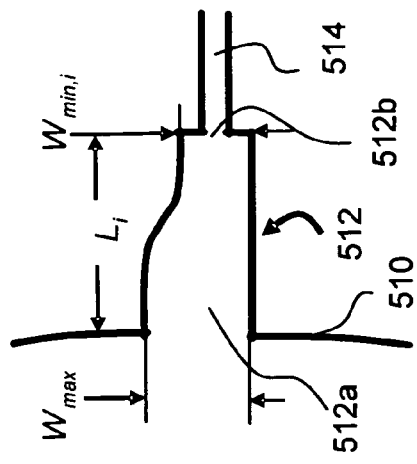
FIG. 7D
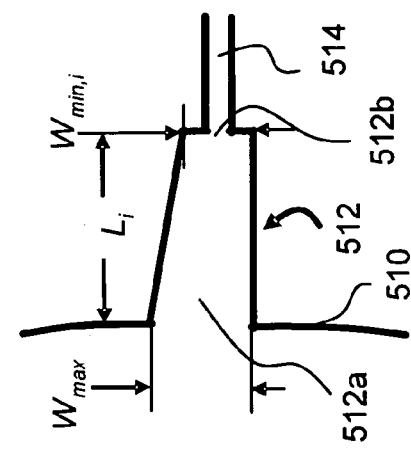
FIG. 7C

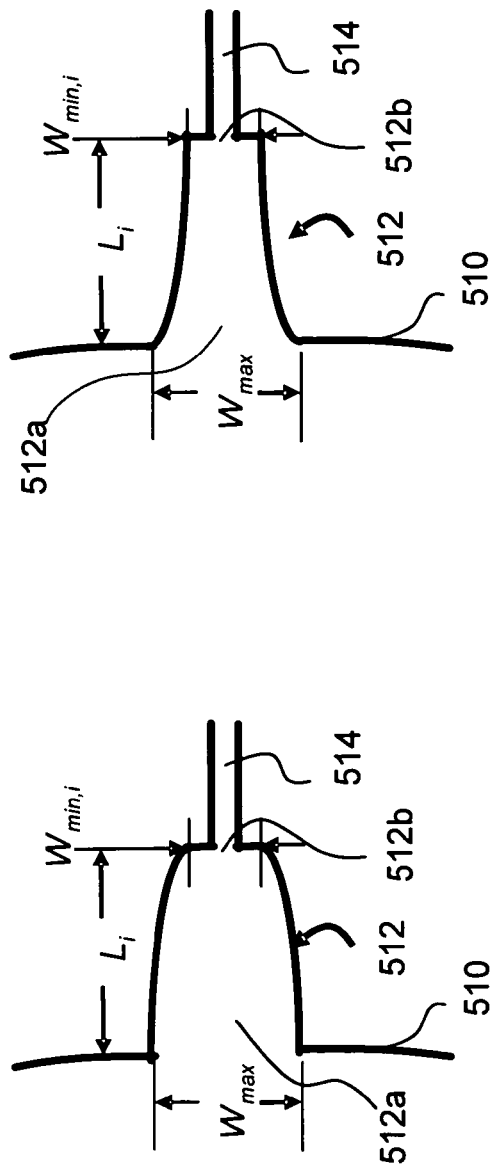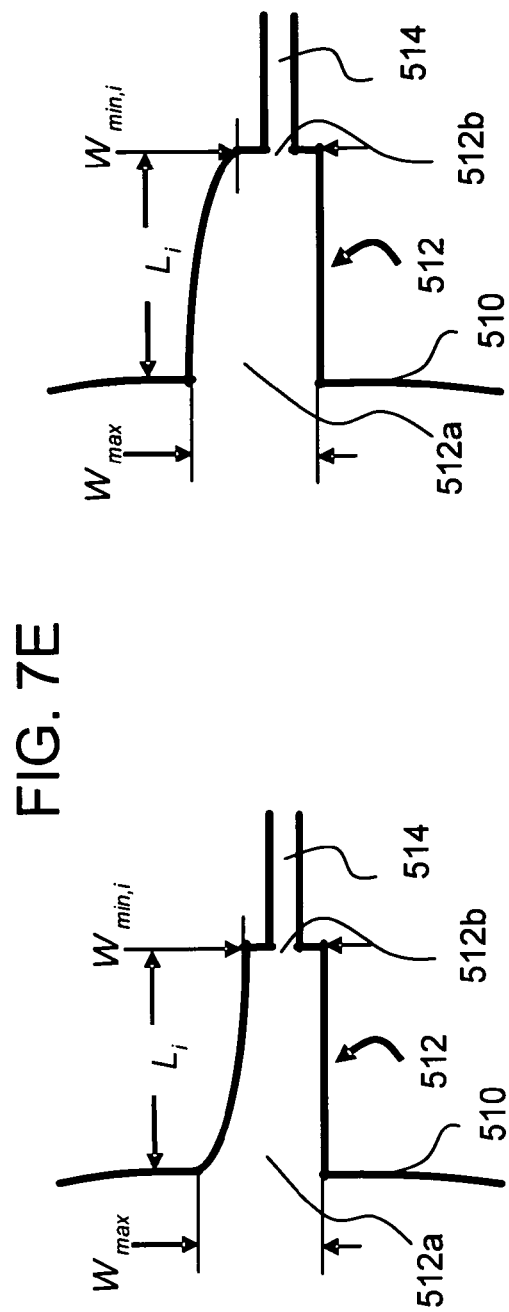
FIG. 7E
FIG. 7F
FIG. 7G
FIG. 7H

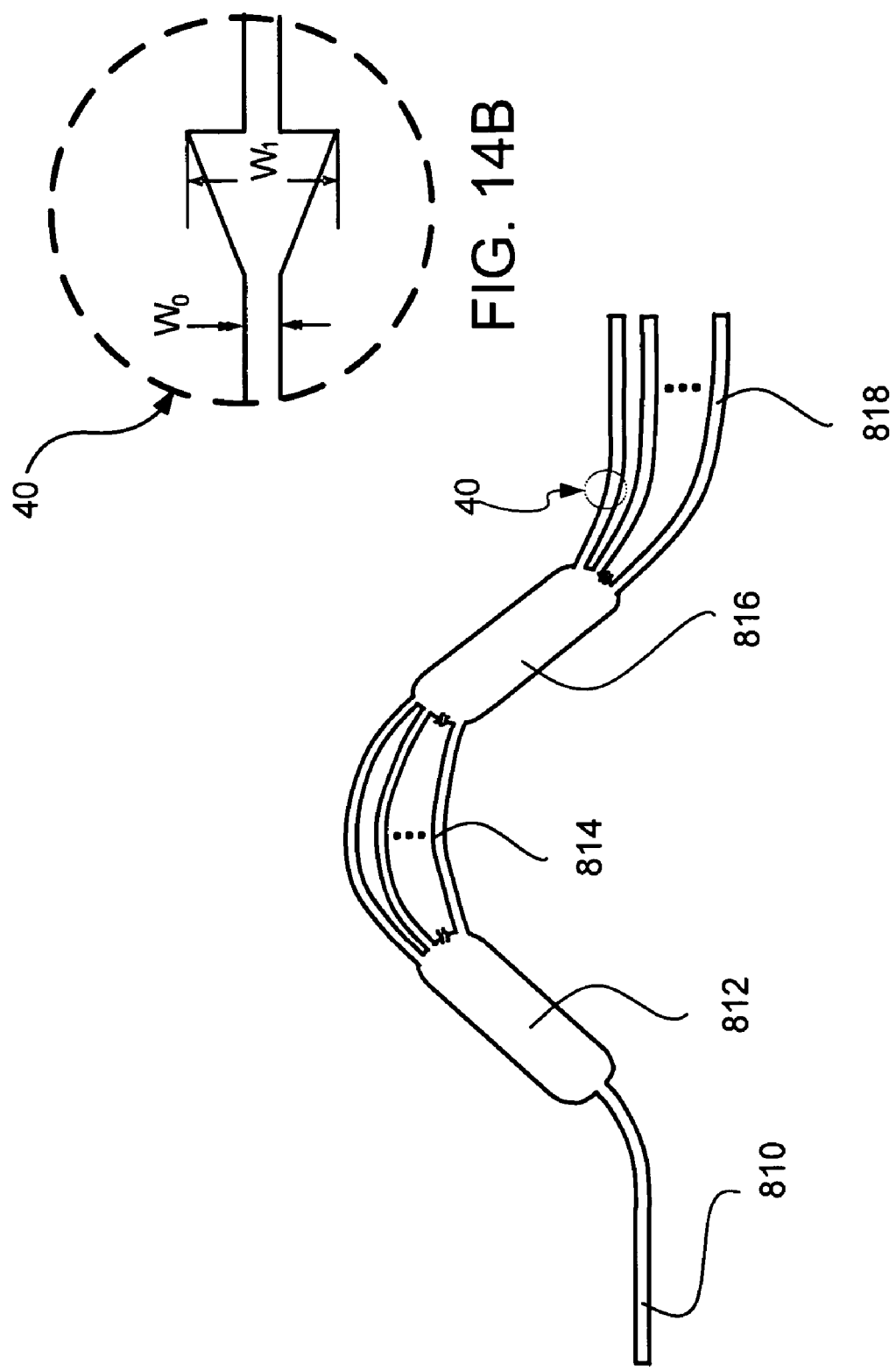

ARRAYED WAVEGUIDE GRATING DEVICE

FIELD OF THE INVENTION

The present invention relates to an arrayed waveguide grating (AWG); more particularly, relates to utilizing an AWG member, a taper MMI coupler and a taper optical attenuator to obtain a uniformed and flattened passband in an optical device.

DESCRIPTION OF THE RELATED ARTS

In a traditional system of an AWG device, no matter a wavelength division multiplexer/demultiplexer (WDM) or an optical router, the passband comprises a distribution like a Gaussian function. Hence, an accuracy on wavelength of a laser source for the system is quite demanding so that a laser source with high wavelength accuracy is used and so the cost of the system is greatly increased. In addition, the passbands are not flat and the uniformities between the passbands are not good in an optical router. For an optical communication system, a cheaper laser diode is used as a laser source under a consideration of cost. Yet, after optical signals of laser have passed the AWG, the optical power losses to optical signals with different wave lengths are not the same; and the receiving by the optical detector is further influenced.

A modern AWG device improves the method of passband flattening. A taper waveguide is used to obtain a optical-field distribution with two waves. The taper waveguide is deposed before a first flat waveguide or behind a second flat waveguide to flatten the passband. The result is obvious; yet, because a very wide wavelength width is required for the optical-field distribution of the two waves obtained from the taper waveguide, a much larger size of the AWG device is required.

Regarding the method for improving the uniformity of the passband, there are four types of traditional optical attenuators. One type of attenuator obtains a light attenuation by using the optical loss at places where fibers connects with each other. Another one uses a material capable of absorbing light to weaken optical intensity. The third one reduces optical intensity by reflecting a part of light with a mirror. And the last one couples a part of light with a directional coupler to lessen optical intensity. An optical attenuator using a directional coupler to lessen integrated with an AWG device, where the material used has to be characterized with an photoelectric effect (such as a silicon waveguide) or a thermo-optical effect (such as a silica waveguide or a polymer waveguide). So the material for manufacturing the AWG device is limited. Furthermore, the AWG device is sensitive to temperature and the passband may be deformed by the directional coupler so that the optical attenuator has to be attached at the outside. So, the prior arts do not fulfill users' requests on actual use.

SUMMARY OF THE INVENTION

Therefore, the main purpose of the present invention is to provide an AWG device with a uniformed and flattened passband.

To achieve the above purpose, the present invention is an AWG device, comprising an AWG member, a taper MMI coupler and a taper optical attenuator. The AWG member comprises a 1×M star coupler, where a light is transmitted to a first flat waveguide through a first input waveguide to be divided into M lines; an AWG, where the AWG comprises an array of M sets of single-mode waveguides having various lengths so that the light in the M sets of single-mode waveguide obtains a specific phase difference; and a M×N star coupler, where, by using a second flat waveguide connected at the back-end of the AWG, the light is passed through the AWG and is transmitted to the front-end of the AWG to obtain multi-slit interferences so that the interferences are focused at the back-end of the second flat waveguide and are coupled to a first output waveguide. Depending on various optical wavelengths, the positions for focusing the interferences at the back-end of the second flat waveguide are different so that the light can be divided according to various wavelengths.

The taper MMI coupler is a taper multimode waveguide with a wider width, which is called a multi mode interference (MMI) area. A second input waveguide is connected to a front-end of the MMI area and a second output waveguide is connected to a back-end of the MMI area. When the light enters the MMI area through the second in put waveguide, the modes of the light are interfered to each other to form regular light dots of interferences. Because the interferences of the modes are occurred in the MMI area, a required distribution of optical field can be obtained by changing its length or its front-end width. And, owing to that the MMI area is not sensitive to the waveguide width error and the wavelength of the optical signal, the passband can be uniformed or flattened. The taper MMI coupler is deposed between the first output waveguide and the second flat waveguide of the AWG member. As a result, after adjusting and amending the optical field through the taper MMI coupler and coupling to the second output waveguide, the passband is uniformed or flattened.

In addition, the taper optical attenuator comprises a taper waveguide where a third input waveguide is connected to a front-end of the taper waveguide and a third output waveguide is connected to a back-end of the taper waveguide. Because the taper waveguide enlarges the optical field inputted, an optical loss occurs when coupling to the third output waveguide to obtain a light attenuation. The taper optical attenuator is deposed amidst the first output waveguide, which controls the light attenuation by changing the back-end width of the taper waveguide to further adjust the intensity of the optical field in the third output waveguide for uniforming the pass band. Accordingly, a novel AWG device is obtained with a uniformed and flattened passband.

BRIEF DESCRIPTION OF THE DRAWINGS

The present invention will be better understood from the following detailed descriptions of the preferred embodiments according to the present invention, taken in conjunction with the accompanying drawings, in which FIG. 1 is a structural view showing an arrayed waveguide grating (AWG) device according to the present invention;

FIG. 2 is a view showing a taper MMI coupler of the AWG device shown in FIG. 1;

FIG. 3 is a view showing a taper MMI coupler of the AWG device shown in FIG. 1;

FIG. 7A through FIG. 7I are structural views showing taper MMI couplers having various tapers according to the present invention;

FIG. 14A and FIG. 14B are structural views showing an AWG having optical attenuators according to the present invention;

DESCRIPTION OF THE PREFERRED EMBODIMENTS

The following descriptions of the preferred embodiments are provided to understand the features and the structures of the present invention.

Figure 4:
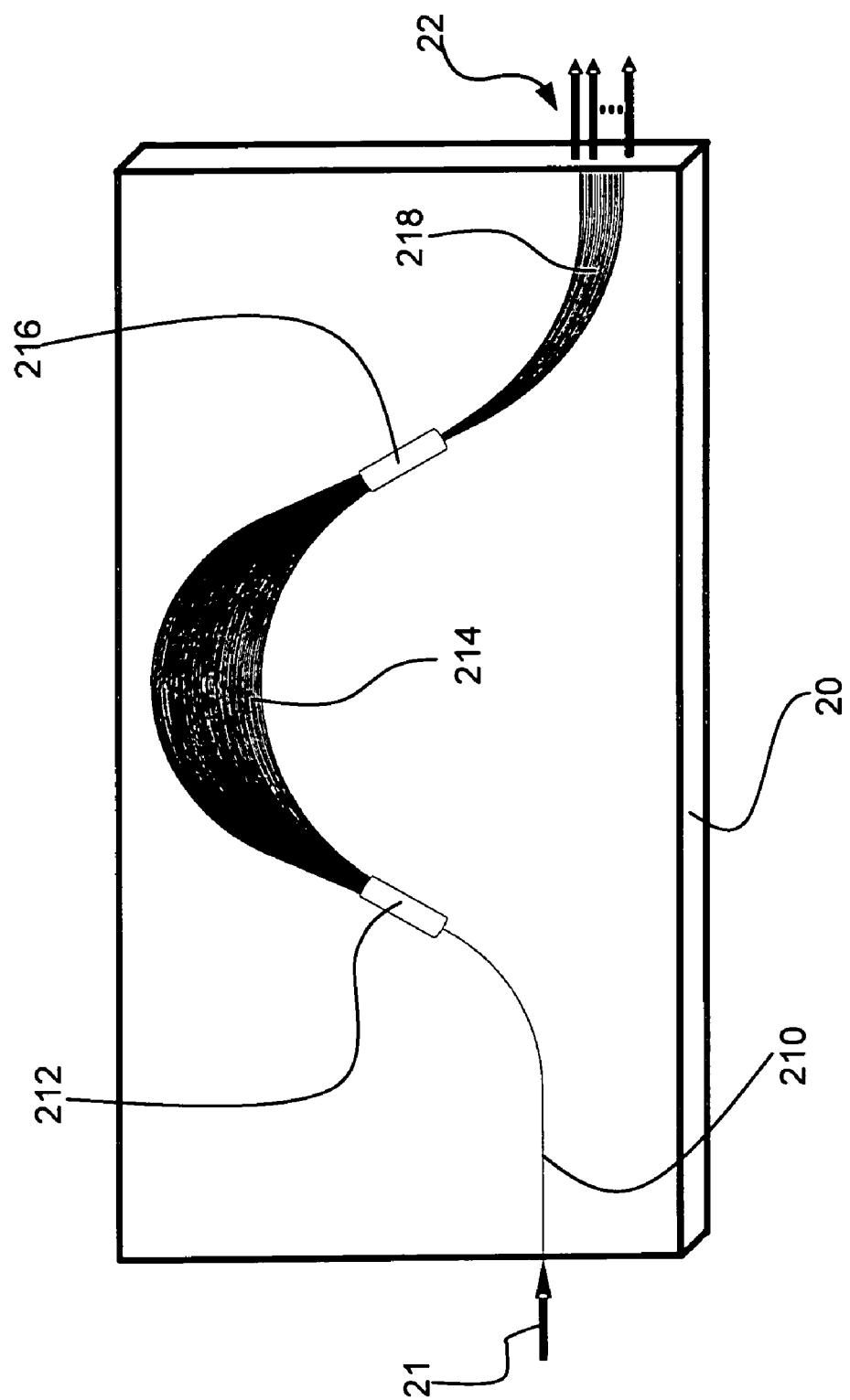
FIG. 4 is an enlarged top-view showing an optical integrated circuits (OIC) of an AWG device according to the present invention.

Please refer to FIG. 1, through FIG. 4, which are a structural view showing an AWG device, a taper MMI coupler of the AWG device, a taper optical attenuator of the AWG device and an enlarged top view showing an OIC of an AWG device, according to the present invention. As shown in FIG. 1, the present invention is an AWG device, comprising an AWG member 10, a taper MMI coupler 30 (as shown in FIG. 2) and a taper optical attenuator 40 (as shown in FIG. 3). The AWG device can be an optical router (i.e. a wave length router) or an WDM. An optical wavelength appears periodically with intervals of a free spectral range (FSR) according to the passband. Yet, such a phenomenon does not happen to an WDM. Hence, an optical wavelength is expressed as $\lambda_{aN+1}, \lambda_{aN+2}, \ldots$, where, for an WDM, a is 0; and, for an optical router, a is an integer and N is the number of the output channels of the optical router. An optical signal 11 is guided into the AWG member 10 from a first input waveguide 110, whose number of waveguides is equal to or more than 1. Then the optical signal 11 passes through the first input waveguide 110 and enters into a first flat waveguide 112. The optical field of the optical signal 11 is scattered there and is coupled into an AWG 114 connected at a back-end of the first flat waveguide 112. The AWG 114 is made of an array of M sets of waveguides, where a length difference between two adjacent waveguides is of a certain number so that the phase difference for the optical field of transmission is fixed. After the optical field is transmitted to a second flat waveguide 116 connected at a back-end of the AWG 114 multi-slit interferences are formed. On a curved surface at a back-end of the second flat waveguide 116, positive interferences are formed at different positions for different optical wavelengths and then is coupled in a taper MMI coupler 30 connected at a back-end of the second flat waveguide 116. By controlling the width and the length of the narrow-end of the taper MMI coupler 30, a distribution of the optical field is adjusted; and, then, wavelengths are transmitted to a first output waveguide 118. The pass band is uniformed and flattened by the taper MMI coupler 30, which is deposed between the second flat waveguide 116 and the first output waveguide 118, and the taper optical attenuator 40, which is deposed amidst the first output waveguide 118; and, the uniforming and the flattening are done through controlling the attenuation of the optical intensity. As shown in FIG. 4, an AWG device according to the present invention is a waveguide pattern on a wafer substrate 20 obtained through a layout mask for an OIC. An optical signal 21 of various wavelength is guided in from at least one first input waveguide 210 and is divided into M sets of waveguides through a first flat waveguide 212 to be coupled into an AWG member 214 of an array of M sets of waveguides, where the AWG member 214 is connected at a back-end of the first flat waveguide 212. Because the waveguides in the AWG member 214 are adjacent waveguides and the length differences in between are fixed, the optical fields are of equal phases on transmitting the optical signal in the AWG member 214. Then, the optical signal is transmitted to a second flat waveguide 216 connected at a back-end of the AWG member 214 while the optical fields obtain fixed phase differences. Because the wavelengths of the light guided into the AWG member 214 obtain equal phase differences, multi-slit interferences are formed on entering the second flat waveguide 216; and, on the curved surface at the back-end of the second flat waveguide 216, positive interferences are formed at different positions for different optical wavelengths. Hence, waveguides are separately coupled to N sets of taper MMI couplers 30 connected at the back-end of the second flat waveguide 216 (as shown in FIG. 1). The waveguides 22 are then transmitted to at least two first output waveguides 218 to flatten the passband while the first output waveguides 218 are added with taper optical attenuators 40 of various optical attenuation; then, as a result, the passband is uniformed and flattened.

Figure 5:
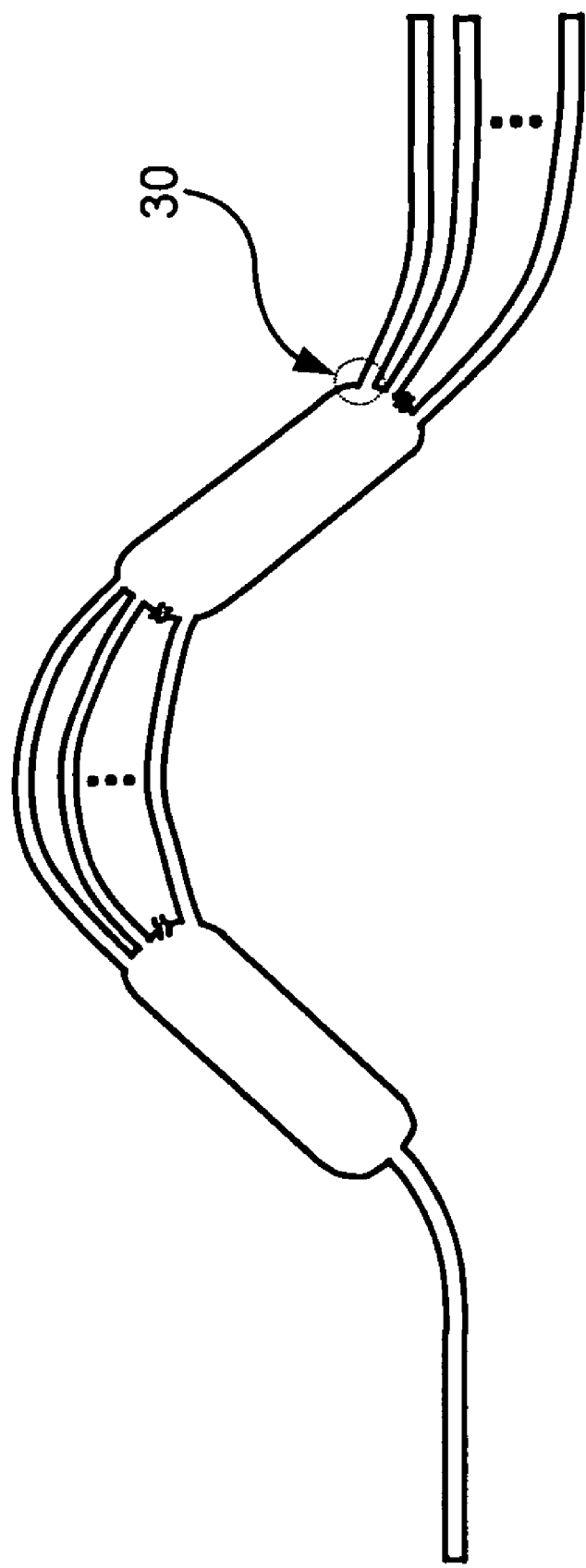
FIG. 5 is a view showing an arrayed waveguide grating device having a flattened passband according to the present invention.
Figure 6:
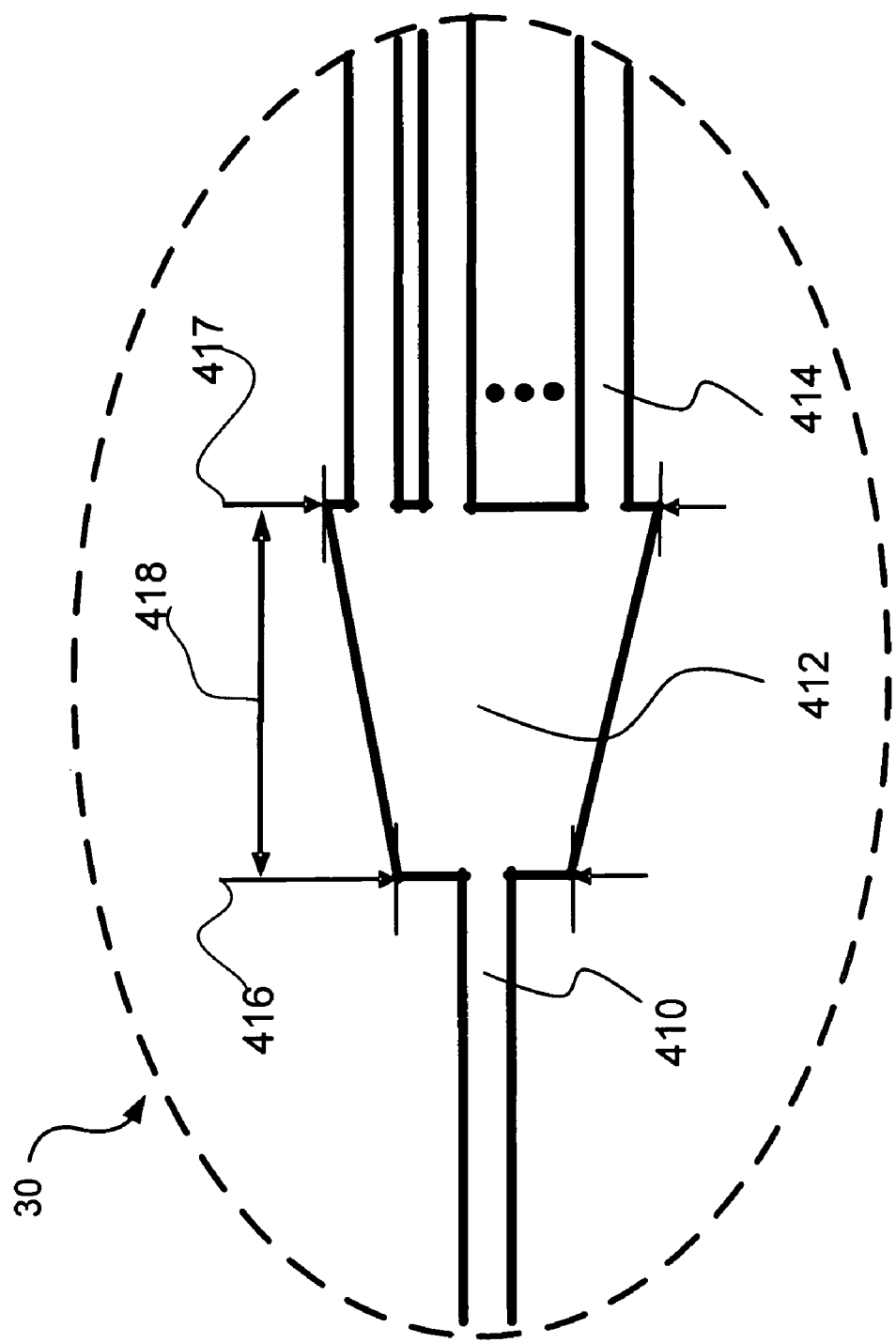
FIG. 6 is an enlarged view of area 30 in FIG. 3.

Please refer t o FIG. 5 and FIG. 6, which are a view showing an AWG device having a flattened passband and a structural view showing a taper MMI coupler, according to the present invention. As shown in the figures, when using an AWG device as a WDM, generally the flatness of the passband is about 0.5 dB. When using the AWG device as an optical router, the flatness of the passband is about 2 dB to 3 dB, which is one of most serious shortages. As channels increases, the flatness of the passband becomes worse either. Therefore, the AWG device of the present invention is added with a taper MMI coupler 30 to uniform or flatten the passband. The taper MMI coupler 30 comprises at least one second input waveguide 410 to guide optical field to a taper multi mode wavelength connected to a back-end of the second input waveguide 410. The taper multimode wavelength 412, which is called a taper MMI area, comprises a front-end width 416 of $W_{min}$, a back-end width 417 of $W_{max}$ and a length 418 of L. When an optical field enters into the taper MMI area, it is changed from single-mode into multimodes; and interferences happen between modes to obtain regular interfering bands. The shining dots obtained from the interfering bands are all self-images of the optical signal which can be used for light-splitting, light-coupling or light-multiplexing. And, the waveguides are coupled to at least two second output waveguides 414 connected at a back-end of the taper multimode wavelength 412.

The process run in the taper MMI coupler 30 is described as follows:

The coupling length for a general MMI coupler can be figured out with the function below:

$$L_c \equiv \frac{\pi}{\beta_0 - \beta_1} \cong \frac{4n_g}{3\lambda_0} W_e^2 \qquad (1)$$

The length of the MMI area can be figured out with the function below:

$$L_{MMI} = a \cdot L_c, \qquad (2)$$

where $$\alpha = \begin{cases} \frac{3}{4N}, & \text{for couplers of } 1 \times N(N \neq 1) \\ \frac{1}{N}, & \text{for couplers of } 2 \times N(N \neq 1) \\ \frac{3}{N}, & \text{for couplers of } N \times N(N \neq 1) \end{cases} \quad \text{and } N \text{ is the number of channels} \qquad (3)$$

Because the MMI coupling area is not a traditional rectangle multi mode waveguide, a function for the coupling length of the taper MMI coupler of the present invention can be obtained by using function (1) together with tapered differentiation and proportionment:

$$L_c = \sum_{i=0}^{M-1} \frac{L_{c,i}}{M} \cong \frac{4n_g}{3\lambda_0} \frac{\sum_{i=0}^{M-1} \eta_i \cdot W_{e,i} \cdot W_{e,i+1}}{M} \qquad (4)$$

where $\eta_i$ is the specific weight factor, $L_{c,i}$, $W_{e,i}$ and $W_{e,i+1}$ are respectively the length of the coupling area; the width of the front-end and the width of the back-end for the $i^{th}$ tapered differentiation area, and M is the tapered divider. The above function (4) can be applied to taper MMI couplers of various structures.

The taper MMI coupler uniforms the AWG, where the taper MMI coupler comprise a double-wave interference. By changing the width of the narrow-end of the taper MMI area or the length of the taper MMI area, the distribution of the optical field at the back-end is adjusted, where the light output efficiency can be controlled to uniform the passband. As the wider is the narrow-end, the weaker is the optical intensity. Yet, by widening the narrow-end to a certain extent, a double wave is formed in the optical field so that, after coupling the optical signal in the focusing optical-field at the back-end of the second flat waveguide, a rectangle distribution is formed and the passband is flattened.

Figure 7I:
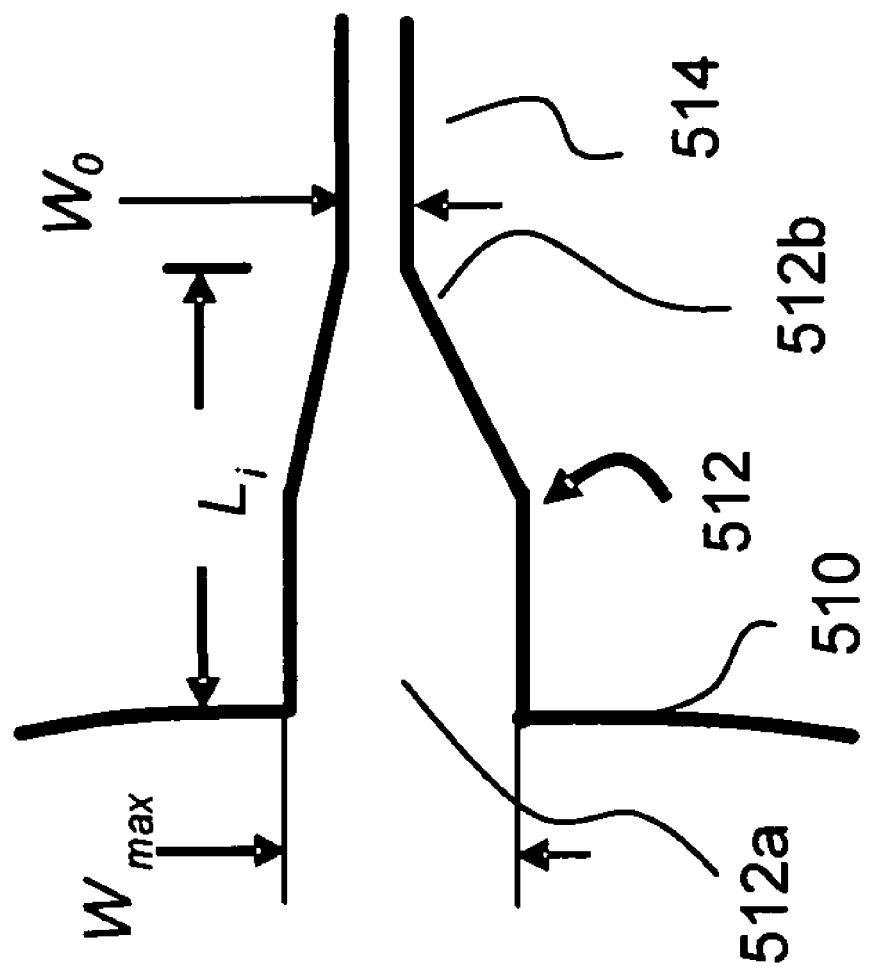

Please refer to FIG. 7A and FIG. 7I, which are structural views showing taper MMI couplers for linear, trigonometric, and exponential functions according to the present invention. As shown in the figures, the functions are obtained by reversing the taper MMI coupler so that the back-ends of the taper MMI coupling areas 512 in the taper MMI couplers become front-ends, which is the front-ends 512a of a new taper MMI coupling areas 512 with a width of $W_{max}$ of the front-end 512a; and the original front-ends become back-ends after reversing, which is the back-end 512b of the new taper MMI coupling areas 512 with a width of $W_{min}$ of the back-end 512b The length of the interference area is L, and its serial number is i. The second input waveguide is then reversed to become a second output waveguide 514 connected to a back-end surface 510 of the second flat waveguide. After a multi-slit interference of the optical signal, the focusing optical-field is coupled at the interface between the back-end surface 510 of the second flat waveguide and the front-end 512a of the taper MMI coupling area. Various modes of the optical field interfere with each other and are focused at the back-end 512b of the taper MMI coupling area; and are coupled to the second output waveguide 514. The present invention uses different taper MMI area structure to obtain different optical-field distribution. The taper MMI coupler can be a multimode waveguide having a taper. The taper is designed to meet a specific requirement, which can be a linear taper (as shown in FIG. 7A), a taper having lines of sine or cosine trigonometric functions (as shown in FIG. 7B), an asymmetrical taper having a line of an linear function (in FIG. 7C), an asymmetrical taper having a line of a sine or cosine trigonometric function (in FIG. 7D), a taper having lines of negative exponential functions (FIG. 7E), a taper having lines of positive exponential functions (as FIG. 7F), an asymmetrical taper having a line of a negative exponential function (FIG. 7G), an asymmetrical taper having a line of a positive exponential function (FIG. 7H), or a taper mixing with horizontal lines (FIG. 7I).

Figure 8:
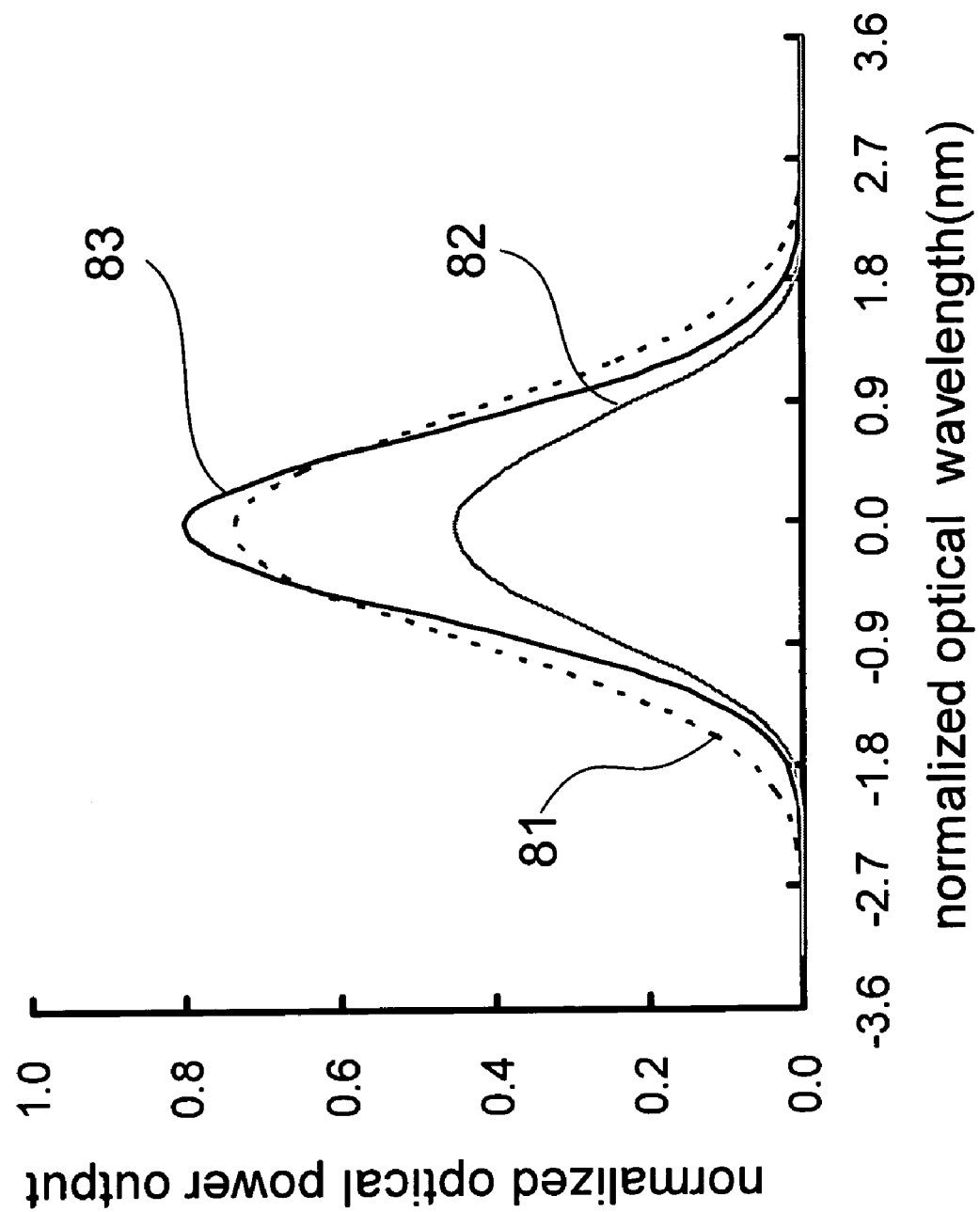
FIG. 8 is a view showing a comparison of passband attenuations for optical routers having different structures.
Figure 9:
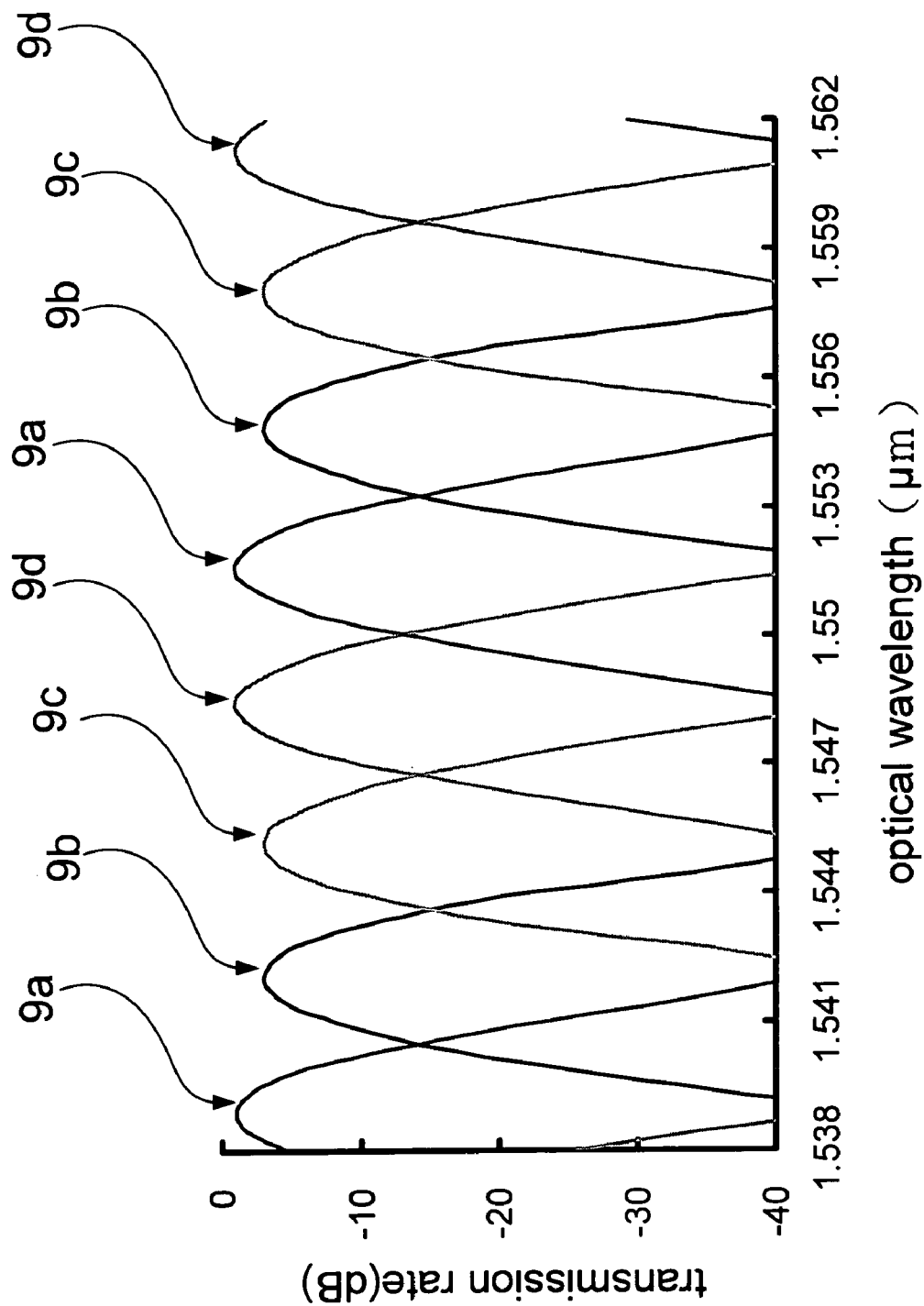
FIG. 9 is a view showing the spectrum for a general optical router of four channels having 400 GHz intervals.

Please refer to FIG. 8, which is a view showing a comparison of passband attenuations for optical routers having different structures; and FIG. 9, which is a view showing the spectrum of a general optical router of four channels having 400 GHz intervals. As shown in the figures, although an optical router 81 using a taper waveguide can reduce the optical power output of the wavelength of the passband, adjacent bands are affected by the taper waveguide broadening the distribution of the optical field, so that the whole crosstalk becomes worse and the reduction of the optical power output is confined when transmitting the crosstalk of the passband. Nevertheless, in an optical router 82 using a taper MMI coupler of the present invention, the optical-field distribution is changed in taper MMI area to limit the optical field so that the optical power output of the passband can be reduced. From then on, the optical-field distribution is kept unchanged so that the adjacent bands are not affected and the crosstalk does not become worse. Yet, the passband of a general optical router 83 comprises an optical power at the middle of the band greater than that at the outer band, where the optical power of the band at the middle is 2~3 dB in theory, which can be worse actually. In FIG. 9, because the passband comprises four channels 9A, 9B, 9C, 9D, the optical power is about 2 dB.

Figure 10:
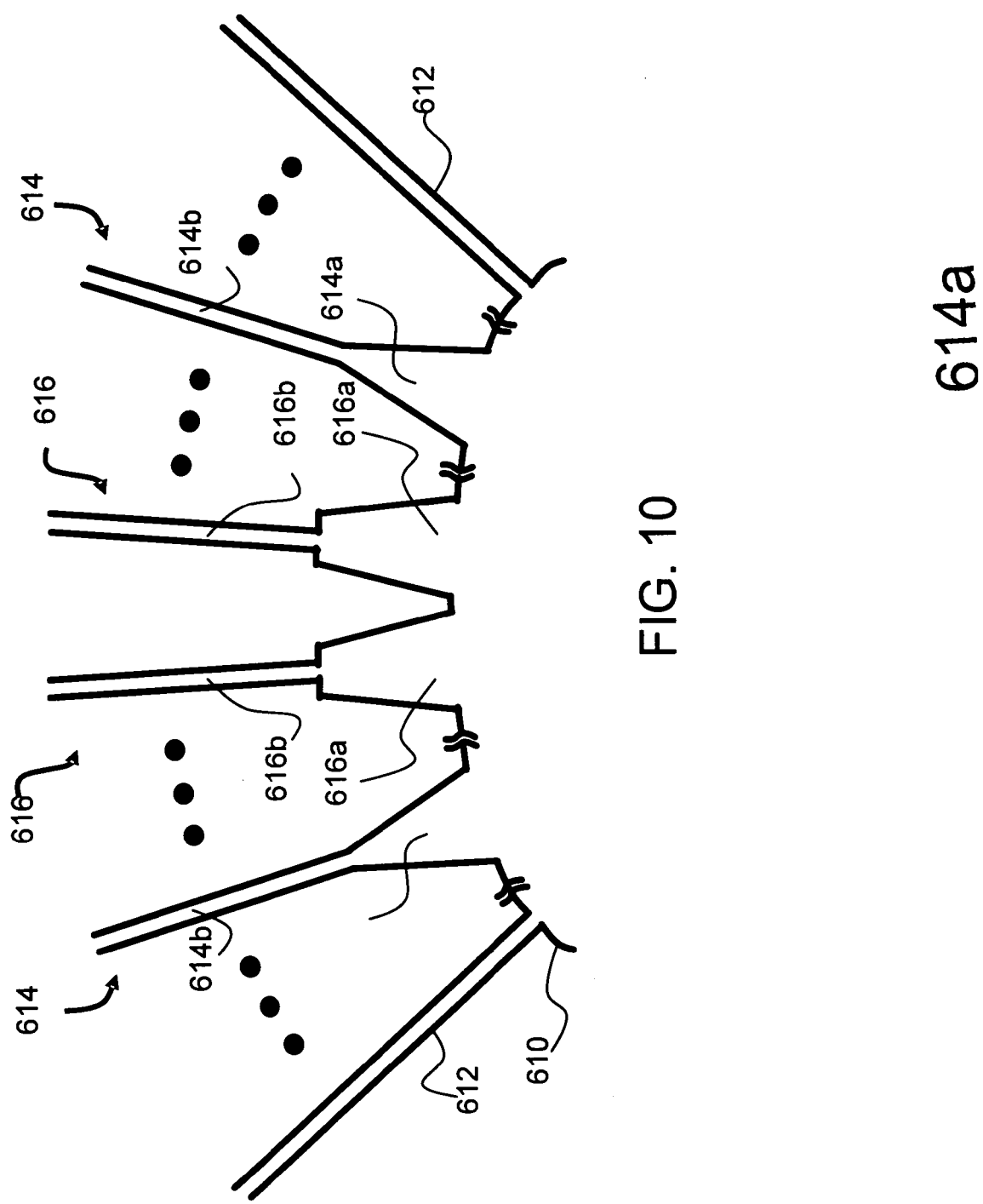
FIG. 10 is a structural view showing an optical router according to the present invention.
Figure 11:
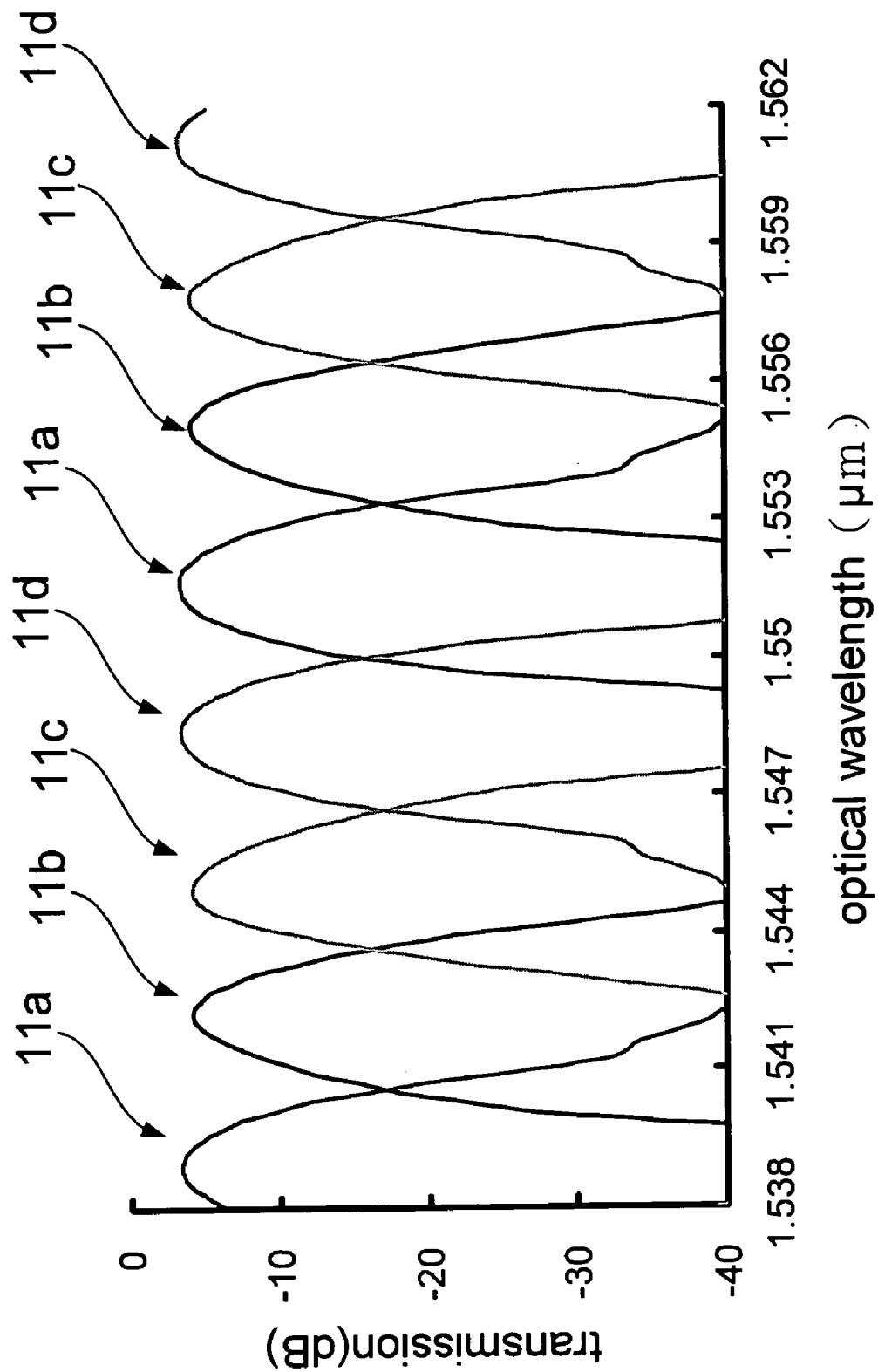
FIG. 11 is a view showing the spectrum of an optical router of four channels having 400 GHz intervals according to the present invention.

Please refer to FIG. 10, which is a structural view showing a n optical router; and FIG. 11, which is a view showing the spectrum of an optical router of four channels having 400 GHz intervals. As shown in the figures, an optical router with uniformed passband according to the present invention comprises a structure of a taper MMI coupler having a various width of narrow-end. Because a general optical router comprises a non-uniformed passband with an output path symmetric to the center, the power of the optical band is gradually reduced from the inside channel to the outer channel, where the two channels at the most outer position is the weakest ones. As a result, the optical router having a structure of a taper MMI coupler can use the taper MMI coupler to control the optical-field distribution for reducing the optical power of various bands so that the passband can be uniformed. Because the width or length of the narrow-end of the taper MMI area can be adjusted by the taper MMI coupler of the present invention, the taper MMI couplers 616a having the widest narrow-end width are deposed before the second output waveguides 616b at the most center position to be connected with the back-end surfaces 610 of the second output waveguide 616b. Because the powers for the most-outer channels 612 are the weakest, no taper MMI couplers are added. Owing to that the strongest optical power at the center band is gradually reduced to the weakest one at the most-outer band, the taper MMI couplers 616a used by the center channels 616 at the most center position comprises a widest width of narrow-end (i.e. the greatest light attenuation); and the width is gradually narrowed down toward inside channels 614 until the width of the narrow-end is equal to those of the output waveguides 614b of the inside channels 614 to obtain general taper waveguides 614a (i.e. the weakest light attenuation). Besides, because the power of the two most-outer channel is the weakest, no taper MMI coupler is added to them (i.e. no light attenuation). In this way, the powers of the passbands are adjusted to be flattened, where the optical router of four channels 11A, 11B, 11C, 11D with uniformed passband according to the present invention comprises a non-uniformity lower than 0.8 dB, far lower than 2 dB for a general optical router.

Figure 12:
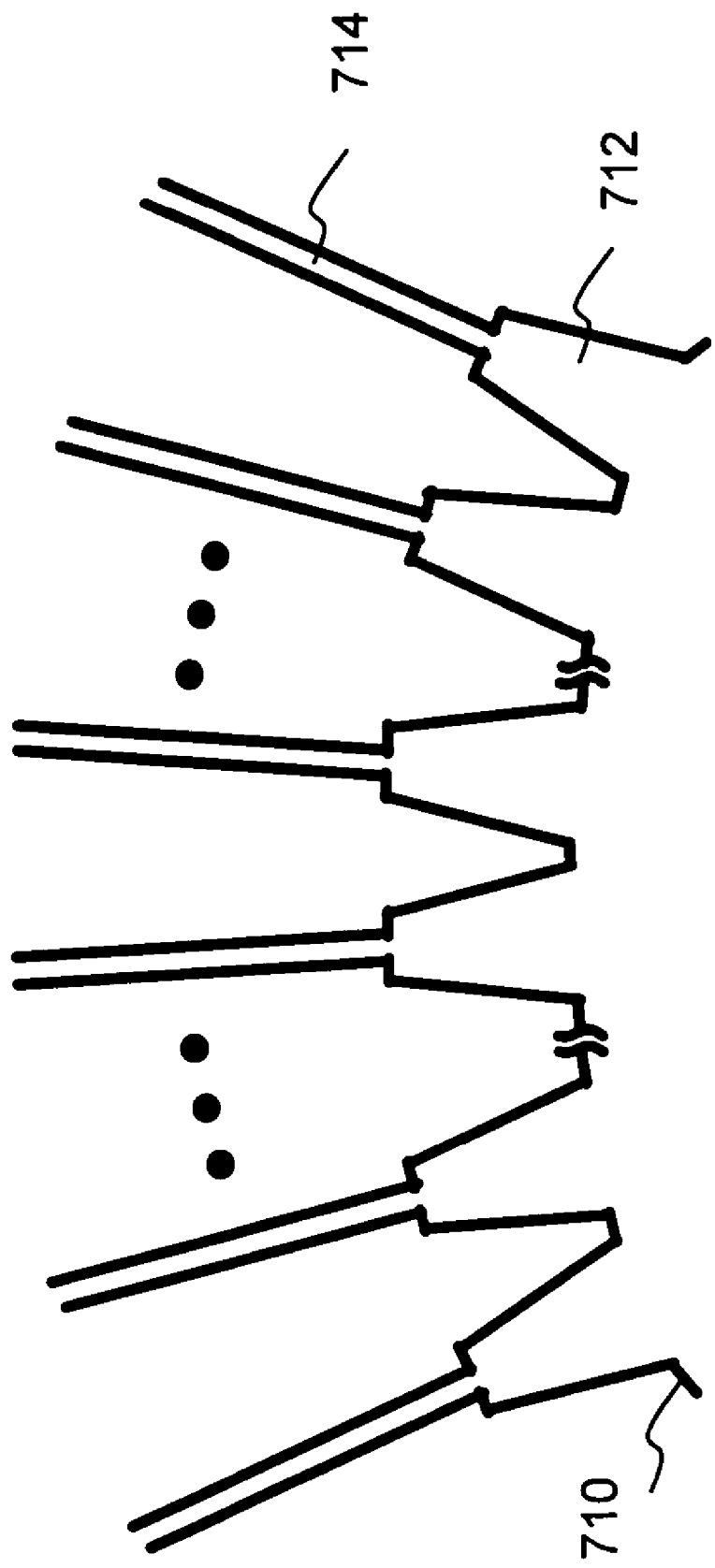
FIG. 12 is a structural view showing a wavelength division multiplexer/demultiplexer (WDM) according to the present invention.
Figure 13:
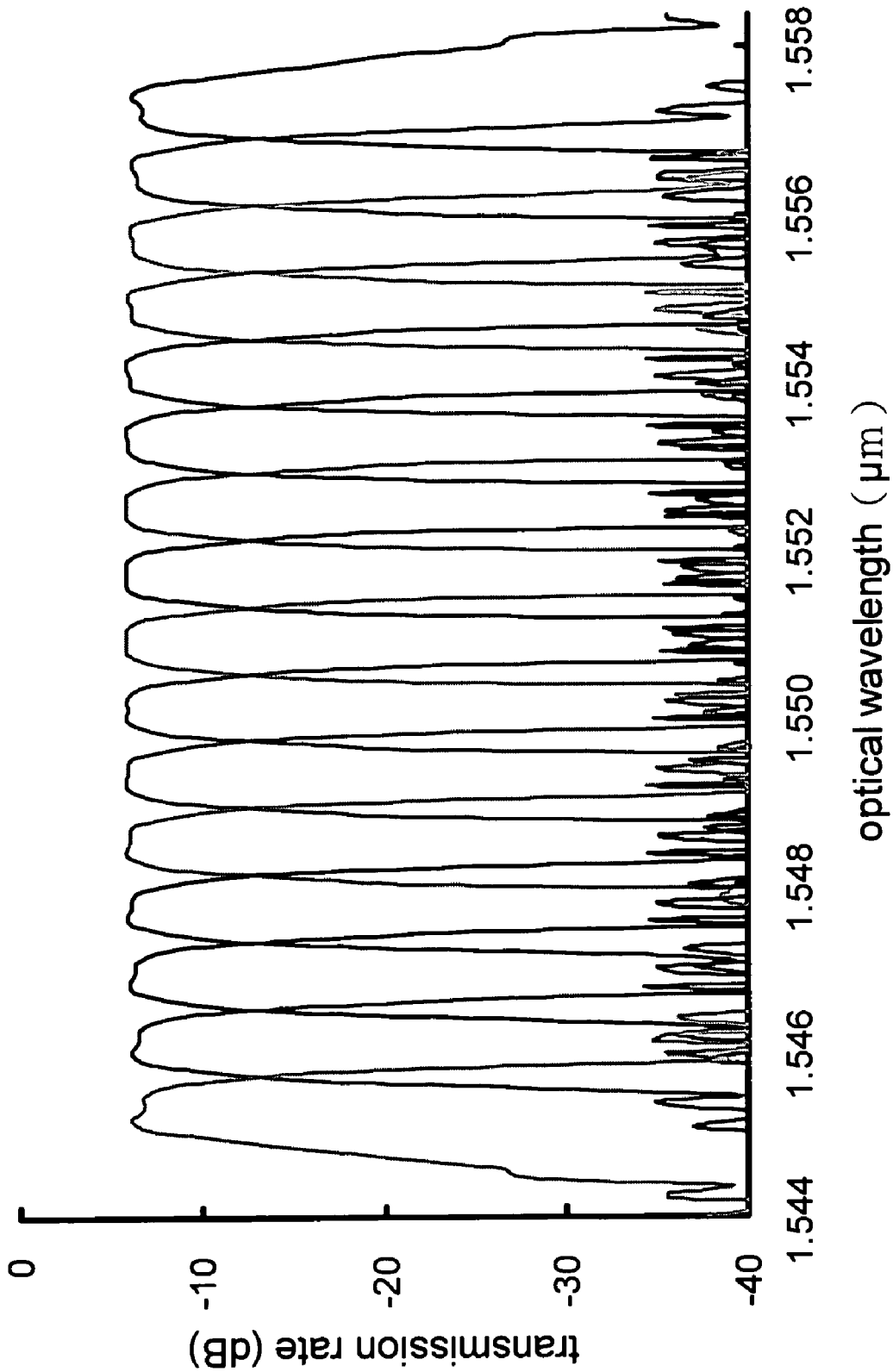
FIG. 13 is a view showing the spectrum of a WDM of sixteen channels having 100 GHz intervals according to the present invention.

Please refer to FIG. 12 and FIG. 13, which are a structural view showing a WDM and a view showing the spectrum of the WDM of sixteen channels having 100 GHz intervals, according to the present invention. As shown in the figures, a WDM with a flattened passband comprises a structure of a taper MMI coupler having a distribution of a double-wave optical field. In a distribution of a double-wave optical field when $W_{min}=10$ μm, a taper MMI coupler 712 is reversely connected between a first output waveguide 714 and a back-end surface 710 of a second flat waveguide of an AWG member. The focusing optical-field is interfered to have a distribution like a Gaussian function. Through coupling with the double-wave optical-field distribution of the taper MMI coupler 712, the optical field is transmitted to the first output waveguide 714 to obtain a flattened passband. As shown in FIG. 13, the sixteen passbands of the WDM of sixteen channels having 100 GHz intervals are all flattened and distributed. Hence, it is clear that the taper MMI coupler of the present invention can uniform and flatten the passbands of an AWG device according to the present invention.

Figure 15C:
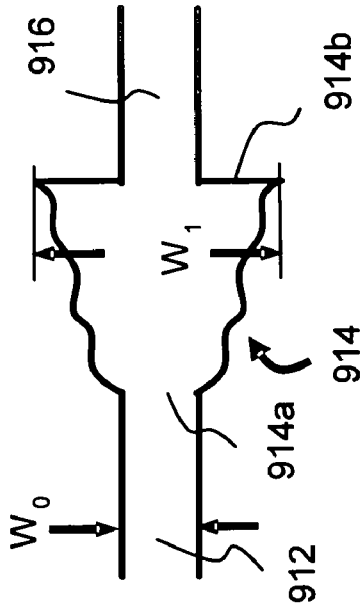
FIG. 15A through FIG. 15V are structural views showing optical attenuators having various tapers according to the present invention.
Figure 15D:
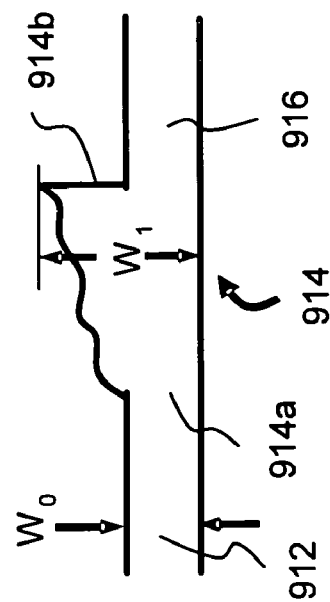
Figure 15A:
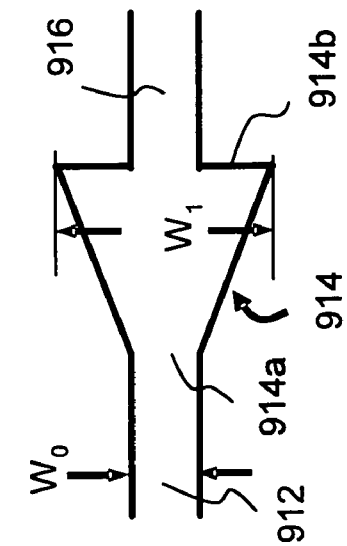
Figure 15B:
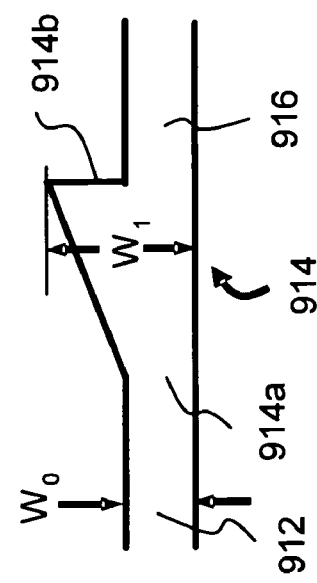
Figure 15E:
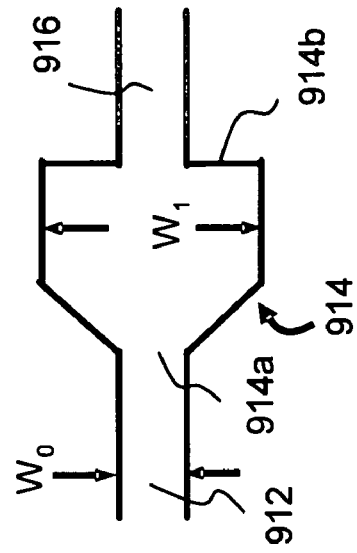
Figure 15F:
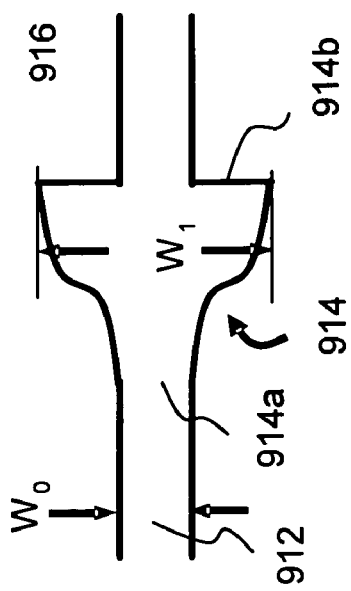
Figure 15G:
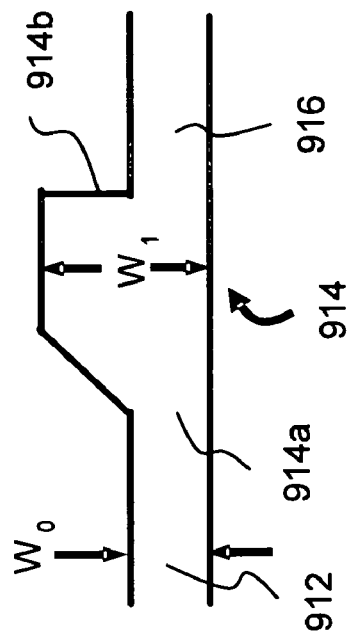
Figure 15H:
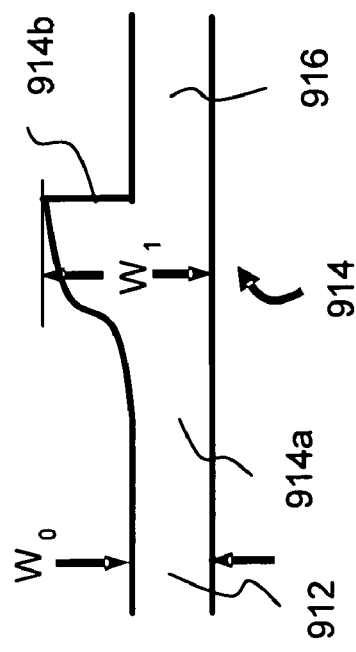
Figure 15I:
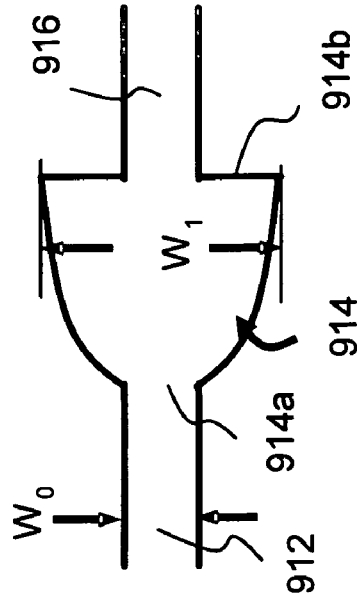
Figure 15J:
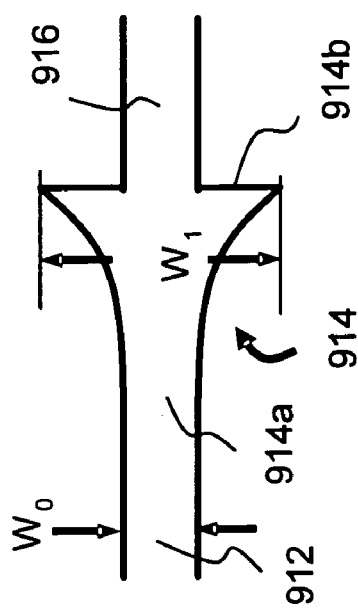
Figure 15K:
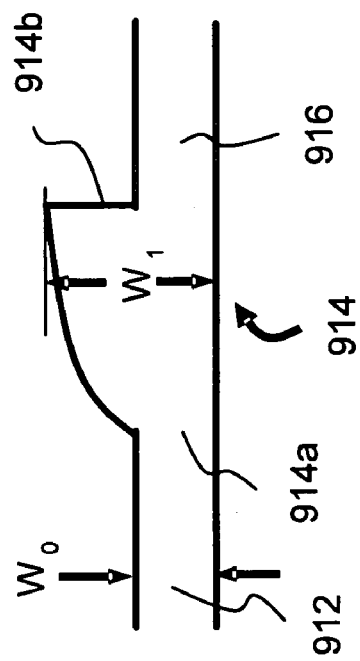
Figure 15L:
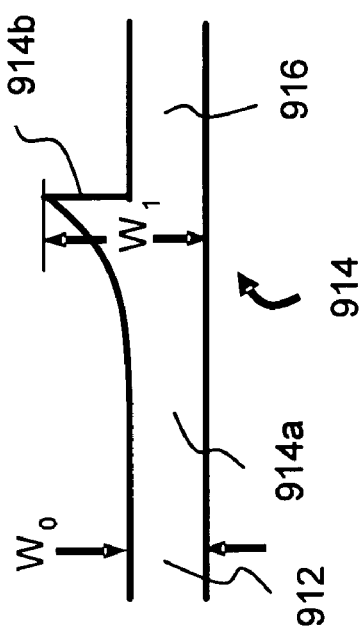
Figure 15N:
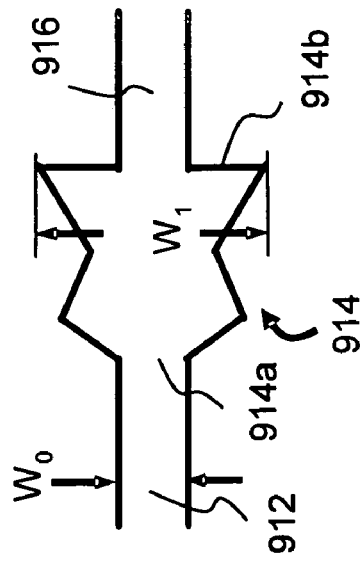
Figure 15M:
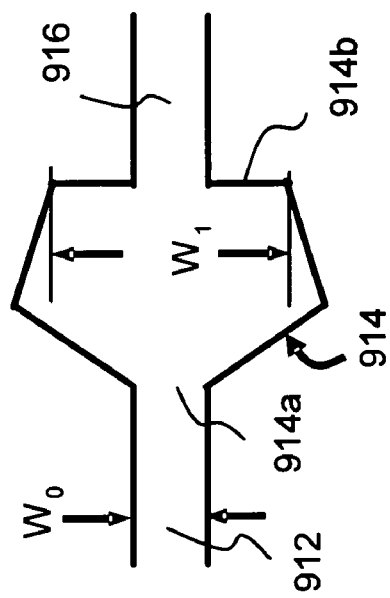
Figure 15P:
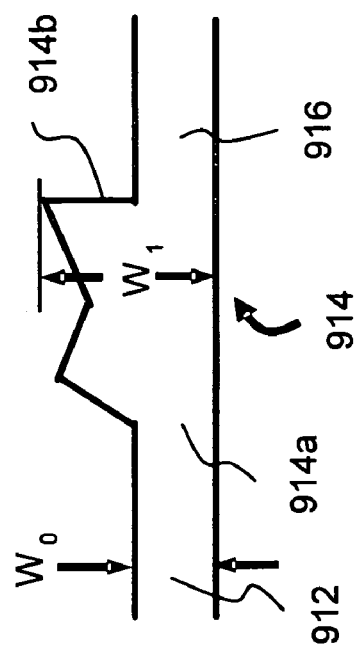
Figure 15O:
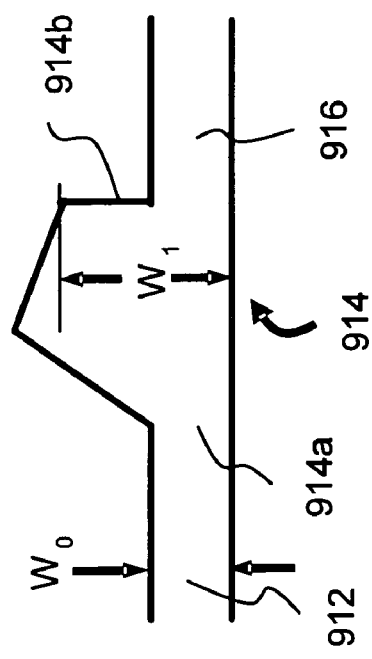
Figure 15Q:
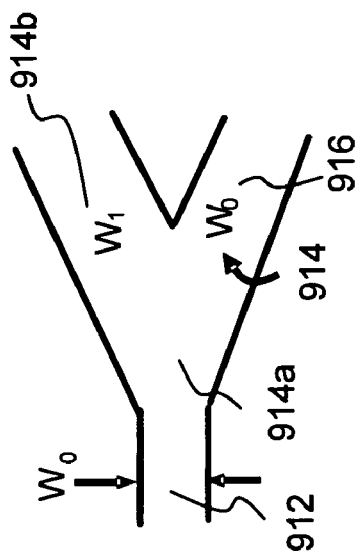
Figure 15S:
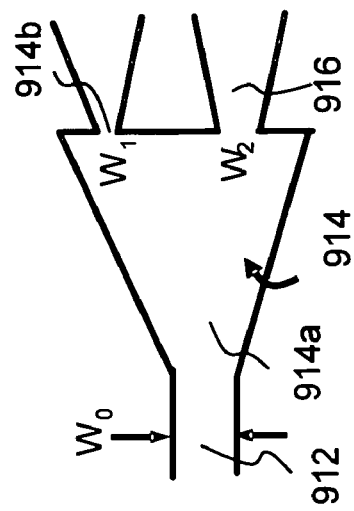
Figure 15R:
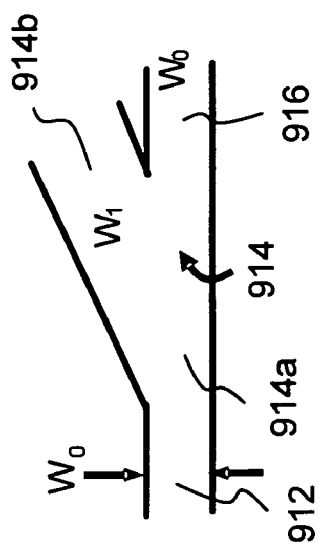
Figure 15T:
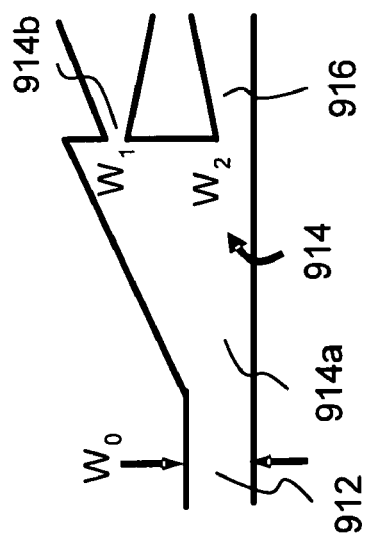
Figure 15U:
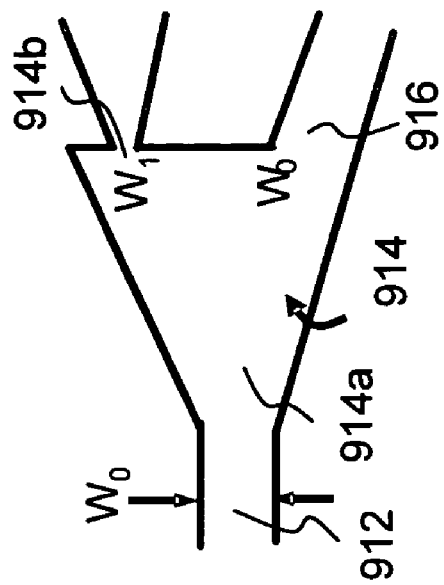
Figure 15V:
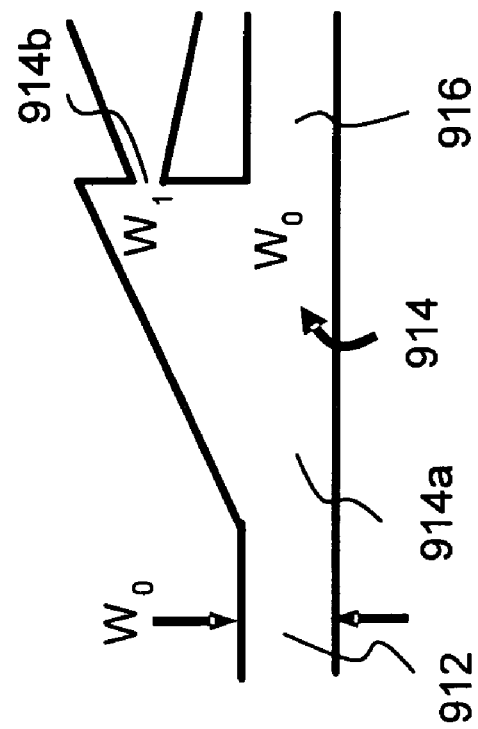

Please refer to FIG. 14, which is a structural view showing an AWG with optical attenuators; and FIG. 15A through FIG. 15V, which are structural views showing various optical attenuators with various tapers, according to the present invention. Because the phase error formed by the limitation of the manufacturing condition can deteriorate the uniformity of the passband, the present invention adds a taper optical attenuator 40 to at least one first output waveguide 818 so that the optical intensity of the passbands can be adjusted to uniform the passbands. Different optical attenuators 40 with different structures of tapers comprise different abilities on attenuating optical intensities. Thus, a taper optical attenuator 40 used in the present invention comprises a taper which can be a linear taper (as shown in FIG. 15A), an asymmetric linear taper (as shown in FIG. 15B), a curve taper (in FIG. 15C), an asymmetric curve taper (in FIG. 15D), a taper of a line of a sine or cosine trigonometric function (FIG. 15E), an asymmetric taper of a line of a sine or cosine trigonometric function (FIG. 15F), a linear taper mixed with rectangle lines (FIG. 15G), an asymmetric linear taper mixed with rectangle lines (FIG. 15H), a taper of a line of a negative exponential function (FIG. 15I), an asymmetric taper of a line of a negative exponential function (FIG. 15J), a taper of a line of a positive exponential function (FIG. 15K), an asymmetric taper of a line of a positive exponential function (FIG. 15L) a taper with double tapers of convex lines (FIG. 15M), an asymmetric taper with double asymmetric tapers of a convex line (FIG. 15N), a taper with double tapers of concave lines (FIG. 15O), an asymmetric taper with double asymmetric tapers of a concave line (FIG. 15P), a bifurcating taper (FIG. 15Q), an asymmetric bifurcating taper (FIG. 15R), a fork-like taper (FIG. 15S), an asymmetric fork-like taper (FIG. 15T), a bifurcating taper mixed with an asymmetric fork-like taper (FIG. 15U) or an asymmetric bifurcating taper mixed with an asymmetric fork-like taper (FIG. 15V). The taper optical attenuator 40 guides an optical signal in from a third input waveguide 912, whose width is $W_0$. A taper waveguide 914 is connected to the third input waveguide 912 with a width changed from $W_0$ to $W_1$, where a narrow-end 914a of the taper waveguide 914 comprises a width of $W_0$ and a wide-end 914b of the taper waveguide 914 comprises a width of $W_1$. Then, the optical field of the optical signal is enlarged as passing through the taper waveguide 914. Because a third output waveguide 916 with a width of $W_0$ is connected to an end of the taper waveguide 914, only a part of the light is coupled to the third output waveguide 916 while the other part of light is radiated out as an optical loss to obtain an attenuation of optical intensity. The width difference between wide-end 914b and the narrow-end 914a of the taper waveguide 914, expressed as $W_1-W_0$, is almost of direct ratio to the attenuation of optical intensity. Consequently, by changing the width of the wide-end 914b of the taper waveguide 914, the optical intensity of the optical signal can be changed as well.

Figure 16:
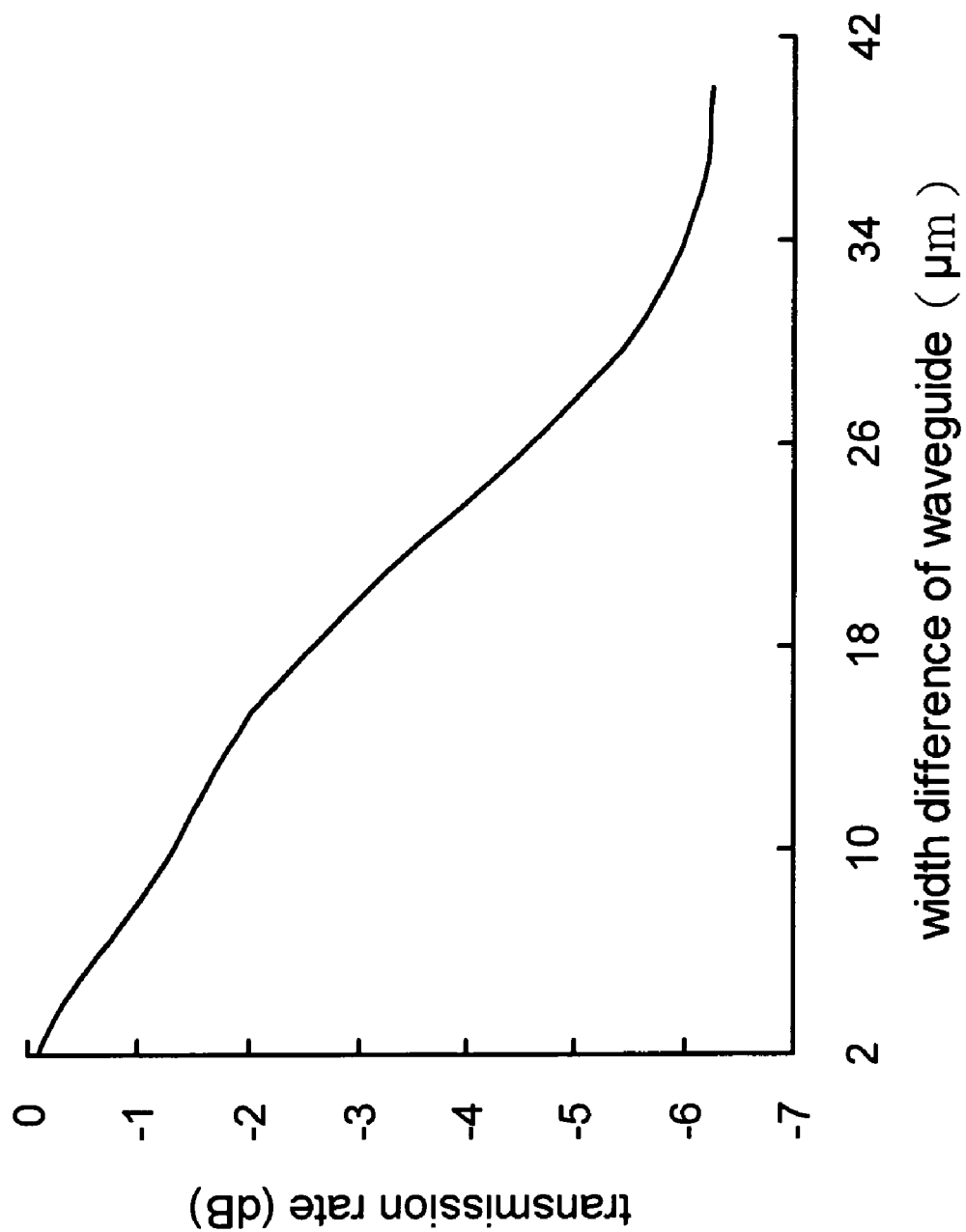
FIG. 16 is a view showing an attenuation of optical intensity of a taper optical attenuator according to the present invention.
Figure 17:
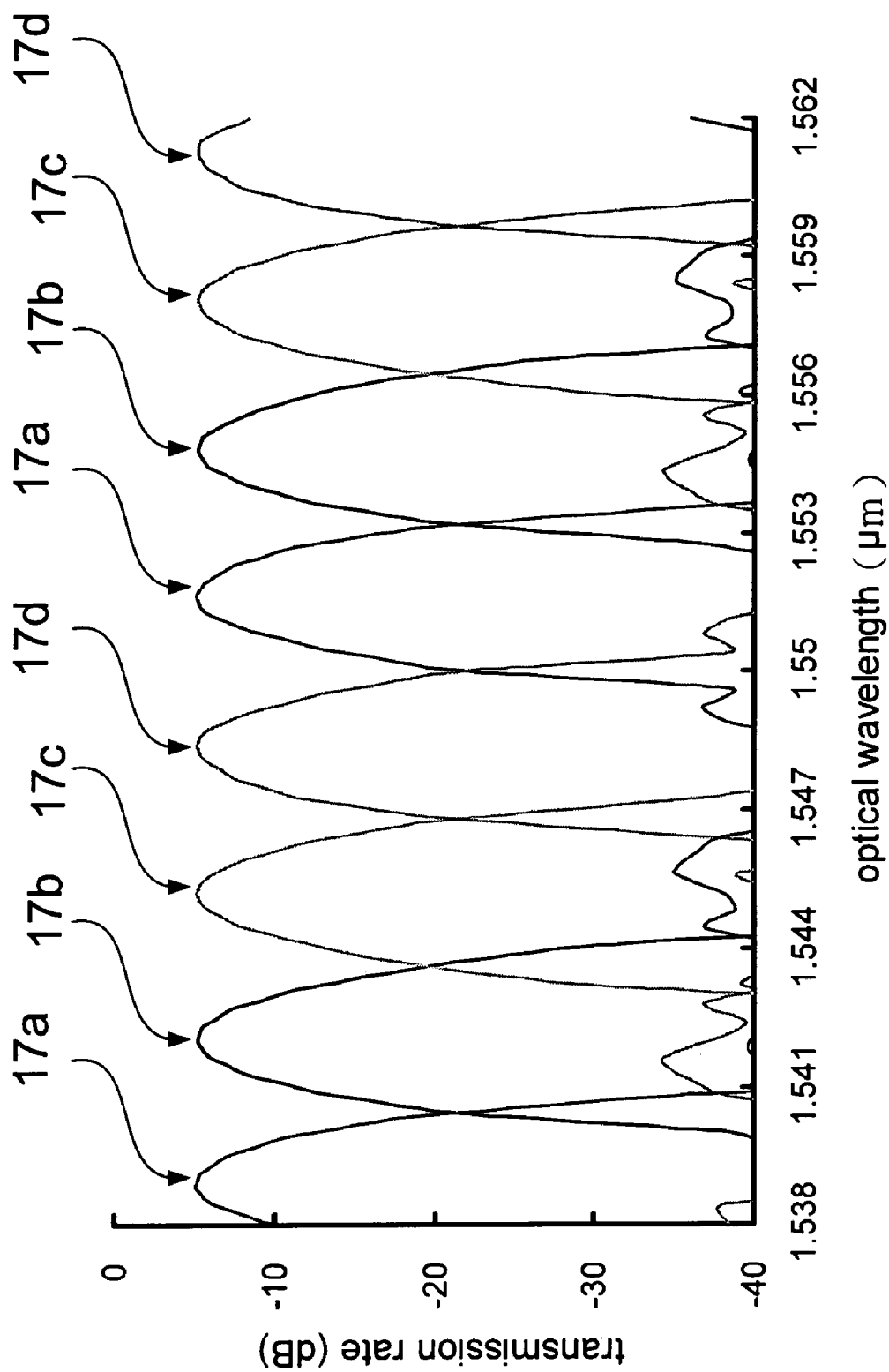
FIG. 17 is a view showing the spectrum of an optical router of four general channel shaving 400 GHz intervals according to the present invention.
Figure 18:
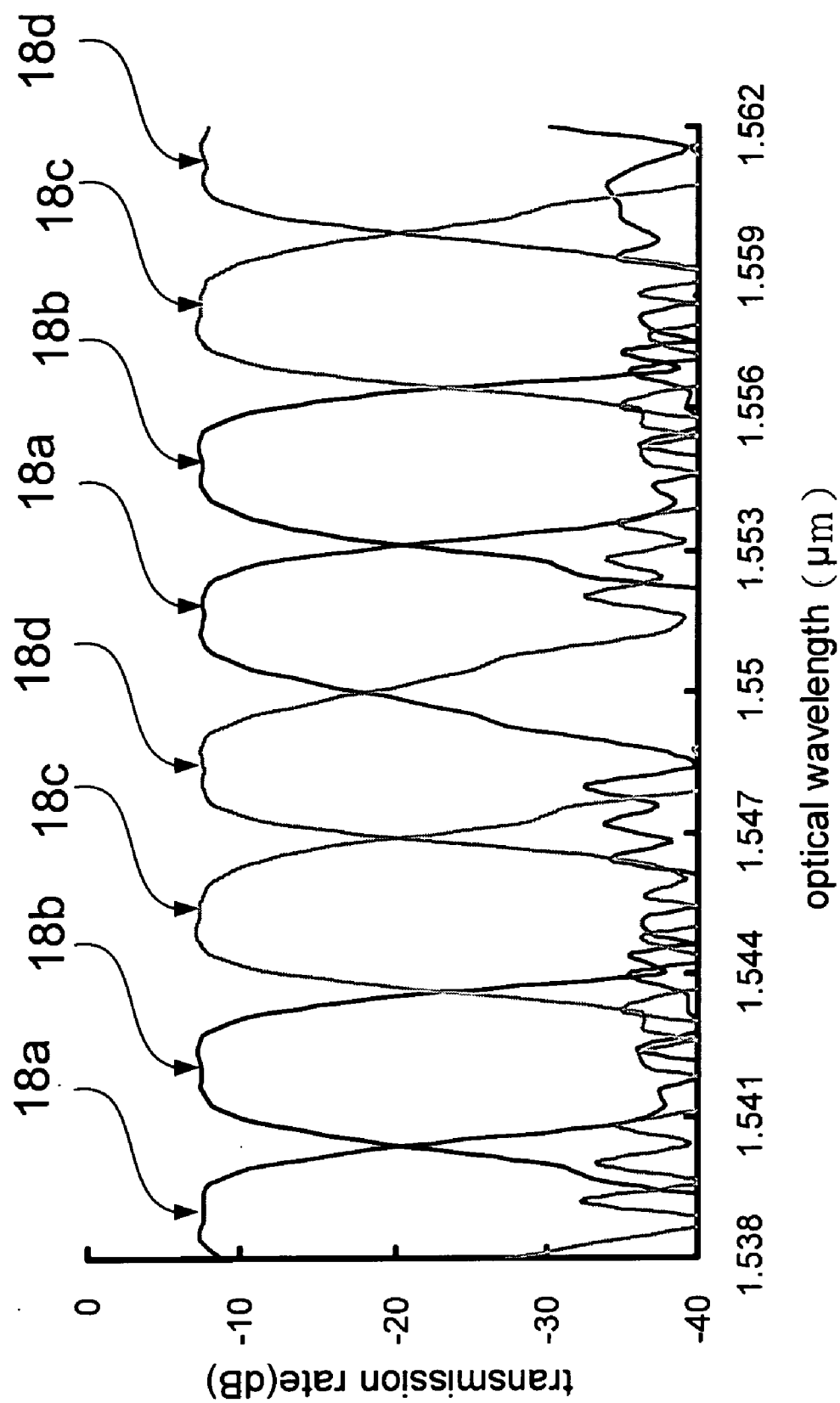
FIG. 18 is a view showing the spectrum of an optical router of four uniformed-and-flattened channels having 400 GHz intervals according to the present invention.

Please refer to FIG. 16, which is a view showing an attenuation of optical intensity of a taper optical attenuator; and FIG. 17 as well as FIG. 18, which are views showing the spectrums of optical routers of four general channels and of four uniformed-and-flattened channels having 400 GHz intervals according to the present invention. As shown in the figures, the narrow-end of a third output waveguide, whose width is $W_0$, is set to be a single-mode waveguide so that the wide-end of the third output waveguide is a changeable parameter, whose width is $W_1$ and the width difference between the wide-end and the narrow-end is $W_1-W_0$. In the range between 2 μm and 33 μm for the width difference, the transmission of optical field comprise a near-linear attenuation; that is, the intensity of the optical signal comprises a near-linear attenuation, which is attenuated from about 0 dB to −6 dB. An optical routers of four totally uniformed channels 17A, 17B, 17C, 17D having 400 GHz intervals according to the present invention comprises a non-uniformity smaller than 0.1 dB, which is almost totally uniformed, so that the passband can be totally uniformed by using the taper optical attenuator added in the present invention. Hence, an AWG of the present invention uses a taper MMI coupler to flatten the passband and the taper optical attenuator to uniform the passband so that a uniformed and flattened passband is obtained. For an optical routers of four totally uniformed and flattened channels 18A, 18B, 18C, 18D having 400 GHz intervals according to the present invention, the whole non-uniformity is smaller than 0.1 dB; and, for a ±0.1 dB difference of transmission rate, the flatness is more than 1 nm, so that the passband of the AWG according to the present invention is totally uniformed and flattened.

Figure 19:
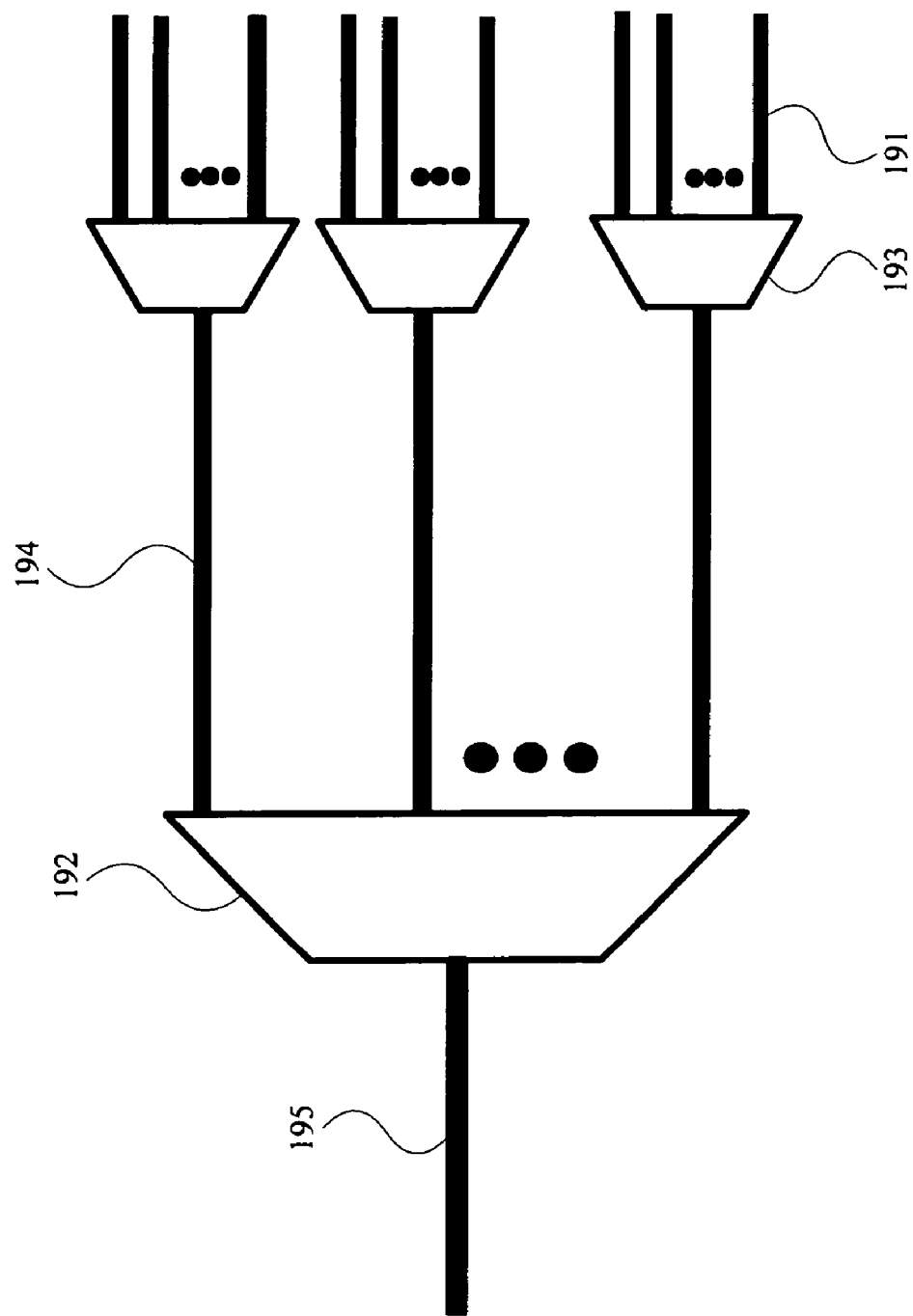
FIG. 19 is a framework view showing the WDM having extra-enormous channels and extra-high density according to the present invention.
Figure 20A:
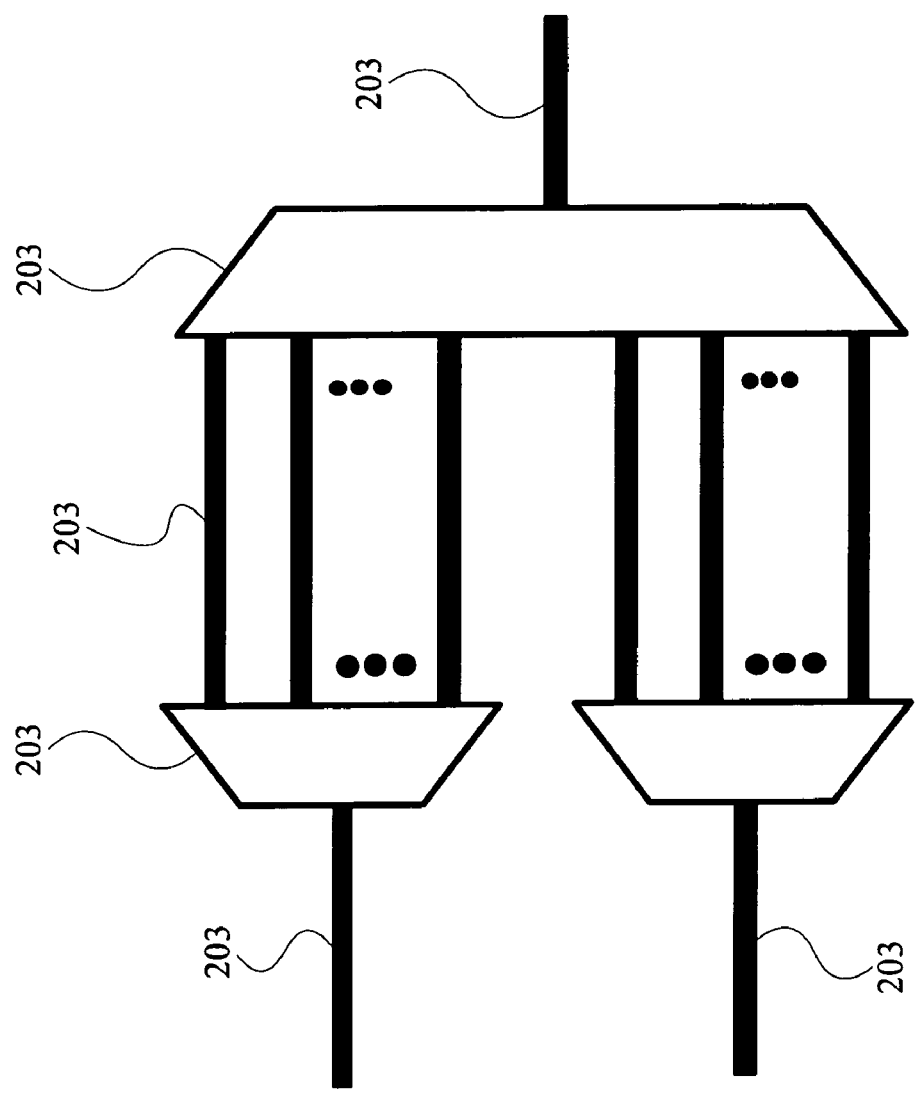
FIG. 20A is a view showing a first framework of a packed multi-wavelength signals (PMS) Adder/Dropper according to the present invention.
Figure 20B:
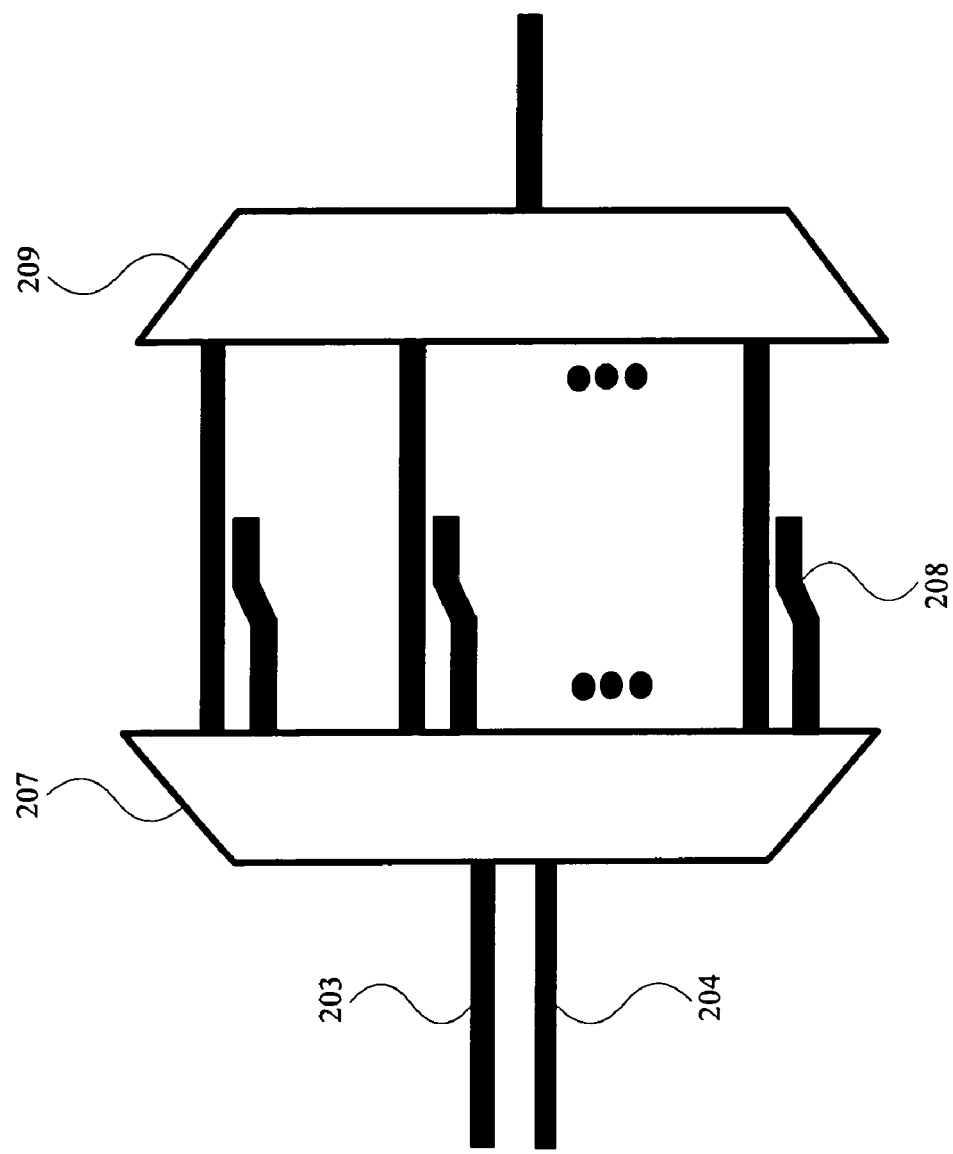
FIG. 20B is a view showing a second framework of a PMS Adder/Dropper according to the present invention.

Please refer to FIG. 19 through FIG. 20B, which are a framework view showing the WDM having extra-enormous channels and extra-high density and views showing a first and a second frameworks of a packed multi-wavelength signals (PMS) Adder/Dropper, according to the present invention. As shown in the figures, an AWG of the present invention can be used as a WDM having extra-enormous channels 191 and extra-high density, which comprises a level-1 optical router 192 and a WDM 193. The level-1 optical router 192 is a 1×m optical router having intervals with high-density. An optical transmission is run in the same output waveguides by the cycle of a passband: $\lambda_i$, $\lambda_{m+i}, \ldots, \lambda_{(k-1)m+i}$ 194, where i is the serial number of the channel. And, the WDM 193 comprises m sets of 1×k WDMs with wider frequency intervals. The optical signals 195 with different wavelengths in the level-1 optical router 192 comprise a difference in frequency interval as a free spectral range (FSR), a quite large one; so, the WDM 193 at the back-end of the level-1 optical router 192 can use a frequency with larger intervals to reduce cost. Besides, the sensitivity for temperature and stress to the phase difference of the AWG is affected to a much lower degree. Therefore, the WDM having extra-enormous channels and extra-high density according to the present invention is of low cost yet with high efficiency.

Besides, the WDM 192 can be used as a PMS Adder/Dropper. The PMS Adder/Dropper comprises a first framework or a second framework, where the principles for both frameworks are the same. The level-1 component of the first framework comprises two 1×N optical router 201, where one is the optical router for main frequency 203 and the other one is the optical router for backup frequency 204. The routers are connected to a level-2 component of 2N×1 optical router 202. The passband of an optical router comprises a cycle, so $\lambda_i$, $\lambda_{N+i}, \ldots, \lambda_{(k-1)N+i}$ 205 of the 1+N optical router are all on the $i^{th}$ output channel; and the whole passband 206 can be expressed as $\lambda_{aN+1}, \lambda_{aN+2}, \ldots, \lambda_{aN+N}$ 203 with $\lambda_{bN+(N+1)}, \lambda_{bN+(N+2)}, \ldots, \lambda_{bN+2N}$ 204, where N is the number of channels, a is the band number for main frequency and b is the band number for backup frequency. Because the passband comprises a cycle, a and b can be any integer and the whole band can be expressed with a number; and the whole band can be multiplexed through the 2N×1 optical router 202 of level-2. Besides that the main band is changeable and adjustable, the backup band is changeable and adjustable too. Therefore, any band can be freely added to or eliminated from a transmission channel. For example, a fiber originally uses wavelengths of $\lambda_1, \lambda_2, \ldots, \lambda_{100}$. Owing to a requirement of wider bandwidth out of the shortage with the bandwidth of the main band, the backup band of wavelengths of $\lambda_{501}, \lambda_{502}, \ldots, \lambda_{600}$ can be added. Consequently, a PMS Adder/Dropper according to the present invention comprises a main band and a backup band with maneuverability.

The second framework of the PMS Adder/Dropper uses a 2×2N optical router 207. The main band 203 and the backup band 204 are multiplexed by a directional coupler 208 to be outputted at the same end through a level-2 component of a N×1 optical router 209. Therefore, any band can be freely added to or eliminated from a transmission channel to increase bandwidth in a maneuverable way.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. An arrayed waveguide grating (AWG) device, comprising: (a) an AWG member; (b) a taper multimode interference (MMI) coupler deposing between a second flat waveguide of said AWG member and a first output waveguide of said AWG member; and (c) a taper optical attenuator deposing amidst said first output waveguide,
   wherein said AWG member comprises: (a) a first input waveguide (b) a first flat waveguide connected to an end of said first input waveguide at an end of said first flat waveguide; (c) an array waveguide connected to another end of said first flat waveguide at an end of said array waveguide; (d) a second flat waveguide connected to another end of said array waveguide at an end of said second flat waveguide; and (e) a first output waveguide connected to another end of said second flat waveguide at an end of said first output waveguide,
   wherein the tapered sidewalls of the taper multimode interference (MMI) coupler extend from the second input waveguide to the first output waveguide.

2. The AWG device according to claim 1, wherein said AWG device comprises at least one of said first input waveguide.

3. The AWG device according to claim 1, wherein said AWG device comprises at least two of said first output waveguide.

4. The AWG device according to claim 1, wherein said taper MMI coupler comprises: (a) a second input waveguide; (b) a taper multimode waveguide connecting to an end of said second input waveguide at an end of said taper multimode waveguide; and (c) a second output waveguide connecting to another end of said taper multimode waveguide at an end of said second output waveguide.

5. The AWG device according to claim 4, wherein said AWG device comprises at least one of said second input waveguide.

6. The AWG device according to claim 4, wherein said AWG device comprises at least two of said second output waveguide.

7. The AWG device according to claim 1, wherein said taper optical attenuator comprises: (a) a third input waveguide; (b) a taper waveguide connecting to an end of said third input waveguide at an end of said taper waveguide; and (c) a third output waveguide connecting to another end of said taper waveguide at an end of said third output waveguide.

8. The AWG device according to claim 1, wherein said taper MMI coupler is a taper multimode waveguide having a taper selected from a group consisting of a linear taper, a taper of a line of a sine trigonometric function, a taper of a line of a cosine trigonometric function, a taper of a line of a negative exponential function, a taper of a line of a positive exponential function, an asymmetric linear taper, an asymmetric taper of a line of a sine trigonometric function, an asymmetric taper of a line of a cosine trigonometric function, an asymmetric taper of a line of a negative exponential function, and an asymmetric taper of a line of a positive exponential function.

9. The AWG device according to claim 1, wherein said taper optical attenuator comprises a taper selected from a group consisting of a linear taper, a curve taper, a taper of a line of a sine trigonometric function, a taper of a line of a cosine trigonometric function, a taper of a line of a negative exponential function, a taper of a line of a positive exponential functions, a taper with double tapers of convex lines, a taper with double tapers of concave lines, a linear taper mixed with rectangle lines, an asymmetric linear taper, an asymmetric curve taper, an asymmetric taper of a line of a sine trigonometric function, an asymmetric taper of a line of a cosine trigonometric function, an asymmetric taper of a line of a negative exponential function, an asymmetric taper of a line of a positive exponential functions, an asymmetric taper with double asymmetric tapers of a convex line, an asymmetric taper with double asymmetric tapers of a concave line, and an asymmetric linear taper mixed with rectangle lines.

10. The AWG device according to claim 1, wherein said taper MMI coupler is a wavelength division multiplexer/demultiplexer (WDM).

11. The AWG device according to claim 10, wherein said WDM comprises an optical router and a WDM with frequency intervals.

12. The AWG device according to claim 10, wherein said WDM is a Packed Multi-wavelength Signals (PMS) Adder/Dropper.

13. The AWG device according to claim 12, wherein said PMS Adder/Dropper comprises a first framework.

14. The AWG device according to claim 13, wherein said first framework comprises a level-1 optical router and a level-2 optical router.

15. The AWG device according to claim 14, wherein said first framework comprises at least two said level-1 optical router.

16. The AWG device according to claim 12, wherein said PMS Adder/Dropper comprises a first framework.

17. The AWG device according to claim 16, wherein said second framework comprises a level-1 optical router, a directional coupler and a level-2 optical router.

* * * * *